US006852219B2

(12) United States Patent
Hammond

(10) Patent No.: US 6,852,219 B2
(45) Date of Patent: Feb. 8, 2005

(54) FLUID SEPARATION AND DELIVERY APPARATUS AND METHOD

(76) Inventor: John M. Hammond, 4295 E. Lake Rd., Livonia, NY (US) 14487

( * ) Notice: Subject to any disclaimer, the term of this patent is extended or adjusted under 35 U.S.C. 154(b) by 73 days.

(21) Appl. No.: 10/378,473

(22) Filed: Mar. 3, 2003

(65) Prior Publication Data

US 2004/0173531 A1 Sep. 9, 2004

Related U.S. Application Data

(60) Provisional application No. 60/398,025, filed on Jul. 22, 2002.

(51) Int. Cl.[7] .............................. C02F 1/48; C02F 9/00
(52) U.S. Cl. ................ 210/222; 210/257.2; 210/195.2; 210/650; 210/416.1
(58) Field of Search ............................ 210/222, 257.2, 210/195.2, 195.1, 416.1, 650, 767

(56) References Cited

U.S. PATENT DOCUMENTS

| | | | | |
|---|---|---|---|---|
| 3,637,081 A | * | 1/1972 | Bradley | 210/110 |
| 3,750,889 A | | 8/1973 | Acosta | 210/497 |
| 4,594,152 A | | 6/1986 | Gullichsen | 209/273 |
| 4,781,830 A | | 11/1988 | Olsen | 210/232 |
| 5,209,822 A | | 5/1993 | Clarke-Pounder et al. | 162/55 |
| 5,262,053 A | * | 11/1993 | Meier | 210/636 |
| 5,338,451 A | | 8/1994 | Lindberg et al. | 210/405 |
| 5,466,384 A | | 11/1995 | Prevost et al. | 210/787 |
| 5,599,447 A | | 2/1997 | Pearl et al. | 210/321.75 |
| 5,620,596 A | | 4/1997 | Engdahl et al. | 210/188 |
| 5,628,909 A | | 5/1997 | Bellhouse | 210/650 |
| 5,641,332 A | | 6/1997 | Faber et al. | 55/523 |
| 5,681,464 A | | 10/1997 | Larsson | 210/321.84 |
| 5,874,006 A | * | 2/1999 | Lee et al. | 210/651 |
| 6,210,572 B1 | * | 4/2001 | Tulchinskiy | 210/223 |
| 6,217,773 B1 | * | 4/2001 | Graham | 210/651 |
| 6,423,022 B1 | * | 7/2002 | Roeher et al. | 604/5.01 |
| 6,423,230 B2 | * | 7/2002 | Ilias et al. | 210/636 |
| 6,547,968 B1 | * | 4/2003 | Rabie et al. | 210/636 |
| 2004/0020866 A1 | | 2/2004 | Hammond et al. | |

FOREIGN PATENT DOCUMENTS

JP 10286563 * 4/1997

OTHER PUBLICATIONS

Static Mixing Technology, (1986), Koch Engineering Company, pp. 1–15, Bulletin KSM–5, License of Sulzer Brothers LTD., Winterthur, Switzerland.
Bird, Stewart, and Lightfoot, "Transport Phenomena," Department of Chemical Engineering University of Wisconsin, John Wiley & Sons, Inc., pp. 43–55.
High Porosity Sintered Materials, Newmet Krebsoge inc., pp. 2–16.
Pall Porous Metal Media Guide, Prosco Products, Inc., pp. 2–19.

(List continued on next page.)

Primary Examiner—Ana Fortuna
(74) Attorney, Agent, or Firm—John M. Hammond

(57) ABSTRACT

A fluid separation and delivery apparatus and method are provided for filtering a fluid from a source and delivering a filtrate derived therefrom to a first destination, and delivering a decantate derived therefrom to a second destination. The fluid separation and delivery apparatus for the method comprises a filter device having an inlet port for connecting to a fluid source, a first outlet port for directing filtrate to a first destination, and a second outlet port for directing decantate to a second destination; an inlet pump connected between the inlet port of the filter device and the fluid source for pumping fluid at a flow rate of $Q_{in}$ into the filter device; and an outlet pump connected between the second outlet port of the filter device and the second destination for pumping fluid at a flow rate of $Q_{out}$ out of the filter device to the second destination. The outlet pump and the inlet pump are sized and controlled so that $Q_{out}$ is less than $Q_{in}$, and so that the resulting flow rate of filtrate $Q_r$ from the filter device through the first outlet port to the first destination is equal to $Q_{in}-Q_{out}$.

3 Claims, 14 Drawing Sheets

OTHER PUBLICATIONS

Office Action mailed Jul. 26, 2000 for U.S. Appl. No. 09/201,503, abandoned Oct. 26, 2000.

Declaration submitted for U.S. Appl. No. 09/201,503.

Copy of U.S. Appl. No. 09/201,503.

* cited by examiner

FLUID SEPARATION AND DELIVERY APPARATUS AND METHOD

CROSS-REFERENCE TO RELATED PATENT APPLICATIONS

This application claims the benefit of the filing date of U.S. provisional patent application Ser. No. 60/398,025 filed Jul. 22, 2002.

This invention relates in one embodiment to a fluid processing apparatus, and more particularly to an apparatus that can separate or concentrate a first phase relative to a second phase in a flowing fluid.

FIELD OF THE INVENTION

A fluid separation and delivery apparatus for separating and/or concentrating a first phase relative to a second phase in a flowing fluid, by the use of a filtration device.

BACKGROUND OF THE INVENTION

There is a need in many industries for a simple apparatus and process to separate or concentrate a first phase relative to a second phase in a two phase flowing fluid. Such commercial and industrial applications for the present invention occur in the fields of medicine, food manufacturing, energy, electronics, imaging devices, chemicals, ceramics, and many others.

In one embodiment, for example, this invention relates to a liquid dispersion filtration and delivery processes in the manufacturing or fabrication of products in which effective filtration is required in order to ensure the quality of end products, for example, the manufacturing or fabrication and coating of thin films such as photoconductors, photographic film, and magnetic films. In particular, one embodiment of the invention relates to a high precision, high purity micro-filtered coating dispersion filtration and delivery apparatus including a crossflow filtration device in close proximity to a coating operation.

Photoconductive members or photoreceptors, that are for example organic, and which are used in electrophotographic machines, are well known. In the manufacture or fabrication of organic photoreceptors or the like, an organic solvent, a binder resin, and a pigment can be combined and milled for use in a charge generation layer thereof. The pigment and binder resin are chosen to optimize their photoconductive properties, but it is not always possible to optimize the dispersion quality of the resulting coating fluid. Charge generating dispersions that become unstable over time are a common problem in the fabrication of certain organic photoreceptors. Unstable dispersions and particulate impurities result in coating defects in the charge generating layer that lower coating yield during the fabrication process.

Current known photoreceptor coating dispersions containing pigments such as, e.g. benzimidazole perylene and hydroxygallium phthalocyanine, flocculate extensively when quiescent or when handled at low shear flow conditions. Reference may had to U.S. Pat. No. 6,195,443 of Hammond, the disclosure of which is incorporated herein by reference. Further reference may be had to the paper, "A Novel Technique for Investigation of Flow Behavior of Flocculating Dispersions," J. Hammond et al, presented at the International Coating Science and Technology Symposium, Wilmington, Del., May 1998, the disclosure of which is incorporated herein by reference.

Conventional filters in which all of the coating fluid entering the filter housing passes through the filter element typically operate at low shear near the surface of the filter medium. Thus, when a highly flocculating dispersion is delivered into a conventional filter device by a conventional delivery system, flocs of pigment ordinarily tend to form near the surface of the filter medium. The flow field moves the flocs onto the surface and into the bulk of the filter medium, ultimately resulting in plugging of the filter. In photoreceptor manufacturing or similar film or web coating operations, a plugged filter may cause a significant amount of downtime for a filter change, including restart and stabilization of the coating process (for example, for the purging of air bubbles from the filter device). This is obviously a costly interruption of such manufacturing process.

In one coating process embodiment, an initial countermeasure to such a filter problem was simply to use a filter element with a 40 micron pore size. Such a pore size was large enough that the pigment flocs, which form near the filter medium, did not plug the filter. Attempts to filter the dispersion using filter elements rated to retain particles small than 40 microns resulted in plugging of the filters with pigment flocs.

However, in embodiments of organic photoreceptor manufacturing, and other thin film device manufacturing, it is undesirable to use a filter that will allow the passage of particles in the 1 micron to 40 micron size range. Such particles and/or flocs may disrupt flow out of the extrusion die or other coating applicator, causing streaks. Also, the presence of particles of this large a size in the wet coated generator layer is known to result in defects in the dried generator layer. Both particles and streaks will show as defects in the final printed output to the end customer; therefore, any photoreceptor having such defects will not be acceptable.

The suggested use of a crossflow filter is an improvement over prior art filters. However, conventional coating fluid delivery systems in which such a filter is installed are ordinarily not optimum. They are often complex and do not locate the filter in close proximity to the coating die or other coating applicator. Therefore, such a conventional delivery system does not minimize the incidence of particulate defects and pigment flocs, which may be present in the coating fluid that is delivered into the die, and subsequently onto the coated film or photoreceptor. As such, the problem of filtering the coating dispersion at a process location immediately before and in close proximity to the coating application has not been addressed. Such a location of the filter significantly reduces the opportunity for the filtrate to be re-contaminated with undesired particles as it flows from the filter to the coating applicator. The use of a filter in very close proximity to the end use of the filtrate is known as "point-of-use" filtration in the semiconductor industry, and is a highly desired apparatus and process attribute.

There are numerous other applications for the apparatus and processes of the present invention. The present invention is not limited in any way solely to the production of a filtrate. Rather, the present invention is an apparatus and a process to separate or concentrate a first phase relative to a second phase in a multi-phase flowing fluid; or to separate or concentrate a first particle size population relative to a second particle size population in a multi-phase flowing fluid.

For example, in the manufacturing of a foodstuff such as a soup, the present invention may be used to perform a separation thereby providing a first highly viscous, stew-like product stream to a first destination, and a second less viscous broth-like product stream to a second destination.

The present invention is further advantageous because it provides a filtration process wherein a high fluid shear rate exists at the surface of the filter medium. Such a process is useful in the preparation of shear-thinning foodstuffs, such as peanut butter. In one embodiment of the apparatus and process of the present invention, the present invention may be used to perform a separation of flowing peanut butter, wherein a first product stream comprises a "crunchy" peanut butter product comprising solid peanut chunks dispersed in liquid peanut butter flowing to a first destination, and a second product stream comprises a "creamy" liquid peanut butter flowing to a second destination. Many other similar uses of the present invention will be apparent to those skilled in the art.

In the preparation of abrasive particulate slurries used in e.g., surface cleaning, roughening, smoothing, and/or polishing, the present invention may be used to provide a first product stream comprising a population of large particles, and a second product stream comprising a population of small particles. Such a process may be used in the preparation of e.g., high precision optics. In the field of energy, such a use of the present invention has similar applicability in the preparation of coal-water slurries. In the field of mining, such a use of the present invention has similar applicability in the preparation of mineral or ore slurries prior to extraction or smelting.

In the semiconductor electronics industry, the present invention may be used to prepare a substantially particulate-free filtrate to be delivered to a filtrate-using destination, such as e.g., a wafer, magnetic storage disc, or compact disc spin-coating process. Such spin-coating operations are well known in the art of data disc manufacturing and semiconductor manufacturing.

The present invention is also widely applicability in biomedical devices, to separate or concentrate a first phase relative to a second phase in a flowing metabolic fluid; or to separate or concentrate a first particle size population relative to a second particle size population in a flowing metabolic fluid. In one embodiment, the apparatus of the present invention is miniaturized and integrated into a small implantable device, which may be used as e.g. an artificial organ performing a separation process. In another embodiment, the apparatus of the present invention is miniaturized and integrated into a small implantable device, which may be used as e.g. an device to deliver a drug comprising a material phase which would otherwise flocculate or congeal if not maintained in a flowing state at high shear.

It is an object of this invention to provide an apparatus and a method for producing a filtrate comprising fine particles in a liquid, in close proximity to a filtrate-using destination.

It is an object of this invention to provide an apparatus and a method for producing a filtrate comprising fine particles wherein the filter medium does not plug and become blocked by such particles.

It is an object of this invention to provide an apparatus and a method for producing a filtrate comprising fine particles, which is simple to construct.

It is an object of this invention to provide a method for producing a filtrate and a decantate, which is simple to operate and control.

It is an object of this invention to provide an apparatus and a method for producing a first fluid stream comprising large particles and a second fluid stream comprising small particles, wherein the filter medium does not plug and become blocked by such particles.

It is an object of this invention to provide an apparatus and a method for producing a filtrate comprising fine particles wherein the filter medium does not plug and become blocked by such particles, and wherein such apparatus is made sufficiently small as to be implantable within a human body.

It is an object of this invention to provide an apparatus and method for filtering and/or classifying a fluid containing magnetic particles.

SUMMARY OF THE INVENTION

In accordance with the present invention, there is provided a fluid separation and delivery apparatus for filtering a fluid from a source and delivering a filtrate derived from said fluid from said source to a first destination, and delivering a decantate derived said fluid from said source to a second destination comprising a filter device having an inlet port for connecting to a fluid source, a first outlet port for directing said filtrate to said first destination, and a second outlet port for directing said decantate to said second destination; an inlet pump connected between said inlet port of said filter device and said fluid source for pumping fluid at a flow rate of $Q_{in}$ into said filter device; and an outlet pump connected between said second outlet port of said filter device and said second destination for pumping said decantate at a flow rate of $Q_{out}$ out of said filter device to said second destination, wherein said outlet pump and said inlet pump are sized and controlled so that $Q_{out}$ is less than $Q_{in}$, and so that said filtrate flows from said first outlet port of said filter device to said first destination at a flow rate $Q_r$ equal to $Q_{in}-Q_{out}$.

In accordance with the present invention, there is further provided a method of producing and delivering a filtrate from a fluid source to a filtrate destination comprising the steps of pumping fluid from said fluid source at a flow rate of $Q_{in}$ into a filter device having a filter medium, an inlet port, a first outlet port connected to said filtrate destination, and a second outlet port connected to a decantate destination; pumping a fluid decantate at a flow rate of $Q_{out}$ from said second outlet port of said filter device to said decantate destination, wherein said flow rate $Q_{out}$ is less than said flow rate $Q_{in}$; directing fluid to flow through said filter medium of said filter device at a flow rate of $Q_{out}-Q_{in}$, thereby producing a filtrate at a flow rate of $Q_{out}-Q_{in}$; and directing said filtrate to flow through said first outlet port to said filtrate destination at a flow rate of $Q_{out}-Q_{in}$.

BRIEF DESCRIPTION OF THE DRAWINGS

The invention will be described by reference to the following drawings, in which like numerals refer to like elements, and in which.

DESCRIPTION OF THE PREFERRED EMBODIMENTS

Figure 1:
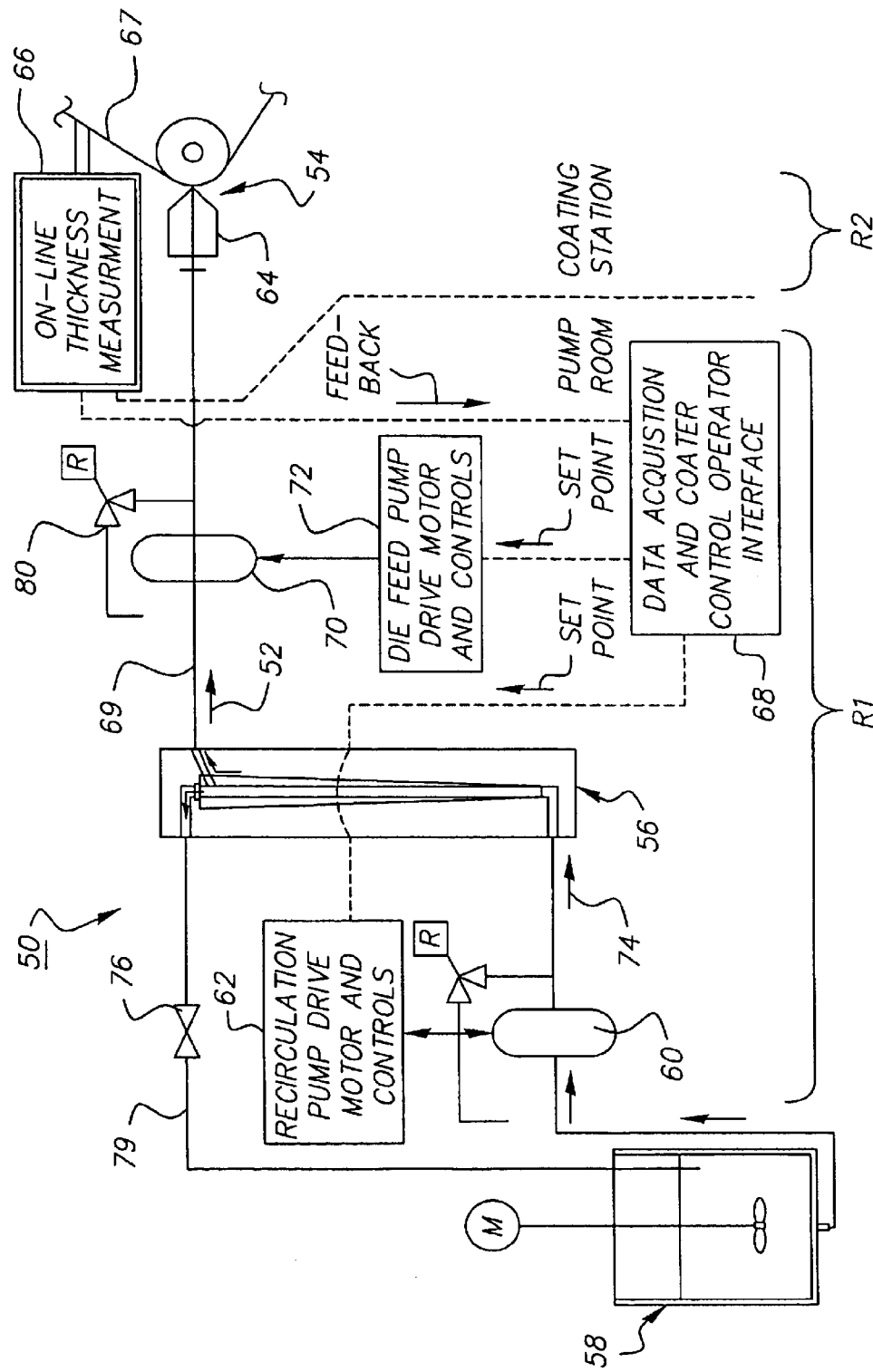
FIG. 1 is a schematic diagram of a conventional fluid filtration and delivery system including a crossflow filter device.

For a general understanding of the present invention, reference is made to the drawings. In the drawings, like reference numerals have been used throughout to designate identical elements. While the present invention will be described in connection with preferred embodiments thereof, it will be understood that it is not intended to limit the invention to such embodiments. On the contrary, it is intended to cover all alternatives, modifications, and equivalents as may be included within the spirit and scope of the invention as defined by the appended claims.

In describing the present invention, a variety of terms are used in the description. Standard terminology is widely used in filtration, fluid delivery, and general fluid processing art. As used herein, a two phase fluid is meant to be a fluid comprising a liquid phase in which either substantially solid particles are dispersed therethrough, or a first liquid phase in which droplets or particles of a second liquid phase immiscible with such first liquid phase are dispersed through such first liquid phase. A multiphase fluid is meant to be a fluid comprising a first liquid phase in which at least one additional second solid or liquid phase is dispersed therethrough.

As used herein, a particle is meant to be a discreet liquid droplet or a solid object, with a characteristic dimension such as a diameter or length of between about one nanometer, and about one-tenth of a meter. The particular size of particles in a fluid being processed will depend upon the particular application.

As used herein, a dispersion is meant to be any fluid comprising a liquid phase in which substantially solid particles are suspended, and remain suspended, at least temporarily.

As used herein, a slurry is meant to be any fluid comprising a liquid phase in which substantially solid particles are present. Such particles may or may not be suspended in such fluid.

As used herein, an emulsion is meant to be any fluid comprising a first liquid phase within which droplets or particles of a substantially liquid second phase are suspended, and remain suspended, at least temporarily. In reference to discreet entities of a second liquid phase in a first liquid phase, droplets and particles are used interchangeably herein.

As used herein, the term crossflow in reference to filtration is meant to denote a filtration configuration in which a flowing fluid is directed along the surface of a filter medium, and the portion of fluid that passes through such filter medium has a velocity component which is "cross-wise", i.e. perpendicular to the direction of the fluid flowing along the surface of such filter medium.

As used herein, the term tangential filtration is meant to denote a filtration process in which a flowing fluid is directed substantially parallel (i.e. tangential) to the surface of a filter medium, and a portion of fluid passes through such filter medium to provide a filtrate. The terms tangential filtration and crossflow filtration are often used interchangeably in the art.

As used herein, in the tangential or other filtration process described herein, the portion of the fluid that passes through the filter medium and out through a first outlet port in the filter device that is operatively connected to such filter medium is referred to as a filtrate. The portion of the fluid that flows along the surface of the filter medium, but does not pass through such filter medium, and passes out through a second outlet port in the filter device that is operatively connected to such filter medium is referred to as a decantate.

Crossflow filtration and tangential filtration are well known filtration processes. Reference may be had e.g., to U.S. Pat. Nos. 5,681,464, 6,461,513; 6,331,253, 6,475,071, 5,783,085, 4,790,942, the disclosures of which are incorporated herein by reference. Reference may also be had to "Filter and Filtration Handbook", 4th Ed., T. Christopher Dickenson, Elsevier Advanced Technology, 1997, the disclosure of which is incorporated herein by reference.

As used herein, a destination to which a filtrate or a decantate is delivered is meant to indicate a process, a process step, or a process operation, rather than a general spatial location. Examples of such processes, process steps, or process operations are coating applicators, coating application processes, packaging processes, surface finishing apparatus and processes, waste collection and/or disposal processes, recycling collection processes, metabolic processes, magnetorheological finishing apparatus and processes, combustion apparatus and processes, and the like.

As used herein, a source is meant to indicate a point of origin of a fluid to be filtered by the apparatus of the present invention. Examples of such sources are slurry manufacturing processes, emulsion processes, liquid dispersion processes, liquid mixing processes, pharmaceutical manufacturing processes, food manufacturing processes, the filtrate and/or the decantate stream as produced by the process of the present invention, and the like.

In one embodiment, the present invention is useful in performing liquid dispersion filtration and delivery processes to filtrate using operations. Such filtrate using operations may comprise, for example, coating operations used in the manufacturing or fabrication of products in which effective filtration is required in order to ensure the quality of end products, including the manufacture of organic photoreceptors by die coating, dip coating, spray coating, and the like.

Referring now to FIG. 1, there is illustrated schematically, a conventional, prior art filtration and delivery assembly 50 for delivering a micro-filtered charge generator coating dispersion 52 to a high precision, high purity liquid processing operation 54, such as an organic belt photoreceptor die coating operation. As illustrated, the conventional filtration and delivery assembly 50 is located ordinarily in two different rooms, the pump room R1, and the operations room or area R2 where the high precision, high purity liquid processing operation 54 is located. As further illustrated, the filtration and delivery assembly 50 includes a filter device 56, a coating fluid vessel 58, a recirculation pump 60 with drive motor and controls 62, and a separate coating die 64 feed pump 70 with its own drive motor and controls 72 that conventionally are located in the pump room R1, a significant or long distance away from the coating operation 54. The coating operation 54 located such a long distance away utilizes a coating die 64 and a thickness measurement device 66 for coating a film 67 for example. A data acquisition and coater control interface 68, and various pressure gauges and sections of conduit or tubing 69 are also utilized.

In operation, the recirculation pump 60 in the pump room R1 delivers a substantial volume 74 of coating liquid through the cross-flow filter device 56, while a throttling valve 76 provides a controlled restriction in a return conduit of tubing 79 that returns the liquid to the coating vessel 58. This restriction provides an increased fluid pressure in the recirculating fluid within the filter device 56 which forces a small portion of the fluid as the dispersion 52 through the filter medium 8 (see FIG. 3), but undesirably backs up and stalls filtered particulates within the filter 56, thereby shortening the life of the filter. The filtered fluid 52 is then metered and fed to the coating die 64 by the die feed pump 70.

The operation of this conventional filtration and delivery assembly 50 as described above is not optimal. Conventionally, the throttling valve 76 is typically hand operated and hand set by an operator in order for equalizing the pressures on each side of the die feed pump 70. Although an automated metering valve could be used, there are other deficiencies. The recirculation pump 60 and die feed pump 70 are independently controlled (see controls 62 and 72), and as filtration conditions change within the filter 56, (for example, as the filter pores begin to accumulate some solid material), separate adjustments usually are required for each pump (60, 70) in order to maintain the desired coating thickness at 66. Such adjustments conventionally are being accomplished by trial and error, and based on data from the on-line thickness measurement device 66.

Most importantly, as pointed out above, the configuration of equipment in the conventional fluid filtration and delivery assembly 50 is such that the filter 56 is located a considerable distance in R1 from the filtrate using operation, for example the coating die 64 in R2. As a consequence, there is a complex sequence of tubing 69, pipe fittings, a pump 70, and valves including for example relief valve 80 between the filter 56 and the coating die 64. This configuration of equipment has been found to include numerous low-velocity and zero velocity (dead space) volumes of liquid therein where particulate contaminates can collect, and be subsequently released, thereby causing disturbances in filtrate flow, as well as defects in the coated film 67.

Figure 2:
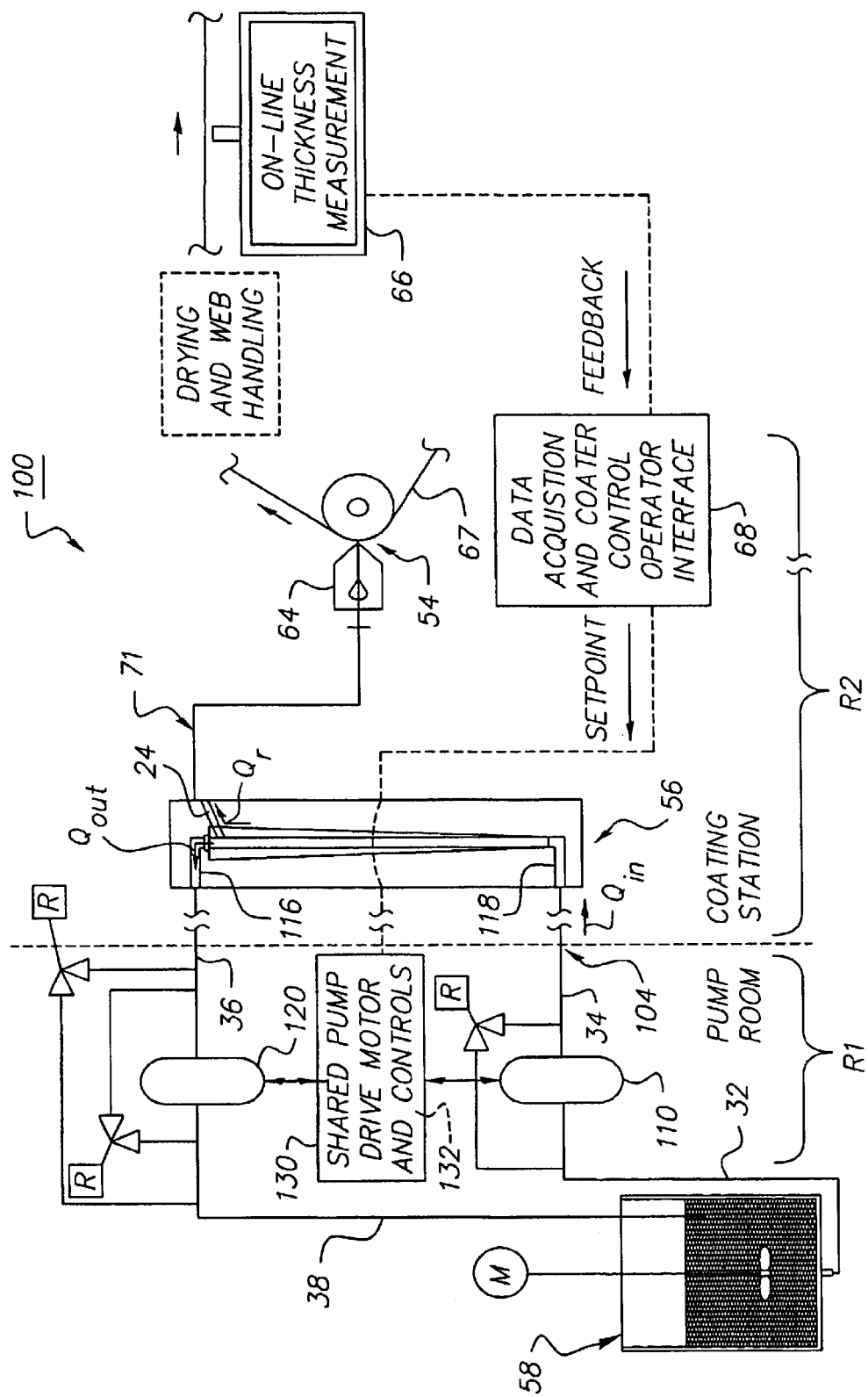
FIG. 2 is a schematic diagram of one embodiment of a coating dispersion filtration and delivery assembly of the present invention.

Referring now to FIG. 2, there is illustrated the coating dispersion filtration and delivery apparatus 100 of the present invention including a filtration assembly 104 comprising a crossflow filtration or filter device 56 located in the operations area R2 in close proximity to the filtrate using operation or coating head or die 64, and a filter inlet pump 110 and a filter outlet pump 120 located within R1 and preferably having a single shared or common drive motor 130 and controller 132. In a further embodiment, the filtration and delivery assembly 100 also includes the coating fluid vessel 58, a coating die 64, a thickness measurement device 66, a data acquisition and coater control interface 68, various pressure relief valves (indicated with an "R" tag) to provide safe operation, various pressure gauges (not shown), and various sections of fluid conduit to such elements.

To operate the filtration assembly 104 (comprising inlet pump 110, filter device 56 and outlet pump 120), the filter inlet pump 110 which is located in the pump room R1 delivers a precisely metered flow of fluid at a flow rate of $Q_{in}$ from vessel 58 through a conduit 32 that is operatively connected to vessel 58 and pump 110, into the filter inlet port 118 through conduit 34 that is operatively connected to pump 110 and to filter inlet port 118 of filter device 56. Simultaneously, filter outlet pump 120 allows a precisely metered flow of decantate fluid at a flow rate $Q_{out}$ out of the filter recirculation outlet port 116, through conduit 36, which is operatively connected to filter outlet port 116 and to pump 110. Such fluid flowing at flow rate $Q_{out}$ is directed back to vessel 58 through conduit 38, which is operatively connected to pump 110 and vessel 58.

Pumps 110 and 120 have capacities $C_{in}$ and $C_{out}$ respectively, each of $C_{in}$ and $C_{out}$ being defined as the volume of liquid delivered per unit of motion of their respective operating mechanisms. The capacities $C_{in}$ and $C_{out}$, as well as the operating speeds, of the inlet and outlet pumps 110, 120 are chosen and set so that the flow rate of fluid $Q_{in}$ into the filter inlet port 118 is greater than the flow rate of fluid $Q_{out}$ out of the filter outlet port 116.

In one preferred embodiment, pumps 110 and 120 are high precision positive displacement metering pumps that are driven by the rotary motion of an electric motor or other rotary power device. Such pumps may be e.g. diaphragm pumps, piston pumps, progressing cavity pumps, gear pumps, and the like. Such pumps are well known in the fluid pumping arts. Reference may be had e.g., to James P. Poynton's "Metering Pumps," Marcel Dekker, Inc., New York 1983) and also to Horst Fritsch's "Metering Pumps, Principles, Designs, Applications" Verlag Moderne Industrie AG & Co., Lasdsberg, Germany 1989, the disclosures of which are incorporated herein by reference.

Such high precision positive displacement metering pumps typically comprise a rotary input shaft, which is operatively connected to the output drive shaft of the electric motor or other rotary power device. As such, in one embodiment, the capacities C1 and C2 of pumps 110 and 120 may be expressed in units of volume per input shaft revolution.

In another embodiment, metering pumps 110 and 120 comprise a linearly actuated fluid displacement device such as e.g., a piezoelectric membrane that is oscillated by an AC voltage applied by an AC power supply connected thereto. In such an embodiment, the capacities C1 and C2 of pumps 110 and 120 may be expressed in units of volume delivered per oscillation of the respective piezoelectric membranes. It will be apparent that the fluid flow rate delivered by either of such pumps is the capacity thereof times the membrane oscillating frequency thereof.

In the embodiment depicted in FIG. 2, it is preferable that the filter inlet and outlet pumps 110, 120 are rotary gear pumps. In one embodiment, such pumps were manufactured by the Zenith Division of the Parker Hannefin Corporation of Sanford, N.C. In such embodiment, it is also preferable that the capacity in displacement per revolution of the inlet pump 110 be between 10 percent and 50 percent greater than that of the outlet pump 120; and that the two pumps 110, 120 be driven by the same pump drive motor 130 (typically an electric motor), and have a common controller 132. Such a configuration is well known and commercially sold by Parker Hannefin. In such configuration, each of the metering pumps comprises a gear operatively connected to the input shaft thereof, and each of such gears is engaged with a single drive gear operatively connected to the output shaft of the electric drive motor.

In this manner, when the two pumps 110, 120 are so engaged with the drive motor 130, and are turning at the same rotational speed due to common control system 132, the resulting flow rate $Q_r$ of filtrate through the filter medium and out of outlet port 24 of filter device 56 is simply $$Q_r = RPM \times (C_{in} - C_{out}),$$

where $Q_r$ is the volumetric rate of filtrate flow through the filter medium in cubic centimeters per minute; RPM is the pump drive shaft rotational speed in revolutions per minute; $C_{in}$ is the capacity of the inlet pump 110 in cubic centimeters of liquid per pump shaft revolution; and $C_{out}$ is the capacity of the outlet pump 120 in cubic centimeters of liquid per pump shaft revolution (assuming that the pumps operate at 100% efficiency).

It will be apparent that the output of filtrate $Q_r$ through the filter is therefore able to be determined by control of a single and commonly controlled process variable, namely pump drive rotational speed. It will be further apparent that the coating fluid vessel 58, filter inlet pump 110, filter outlet pump 120, and shared drive motor and controls 130, 132 can be all located in a single location such as the pump room R1. The filter 56 can thus be remotely located in R2 and advantageously in very close proximity to the coating die 64 or other dispensing device 64 at the coating station 54. This arrangement minimizes the possibility of particulate contaminants being entrained in the filtrate stream between the filter 56 and the coating die 64, thereby improving product yields. The filtration and delivery assembly 100 as such will more effectively provide more highly purified and non-flocculated coating dispersion $Q_r$ to the coating die 64 than conventional fluid filtration and delivery assemblies, thereby resulting in improved yields in e.g., organic belt photoreceptor manufacturing.

Figure 3:
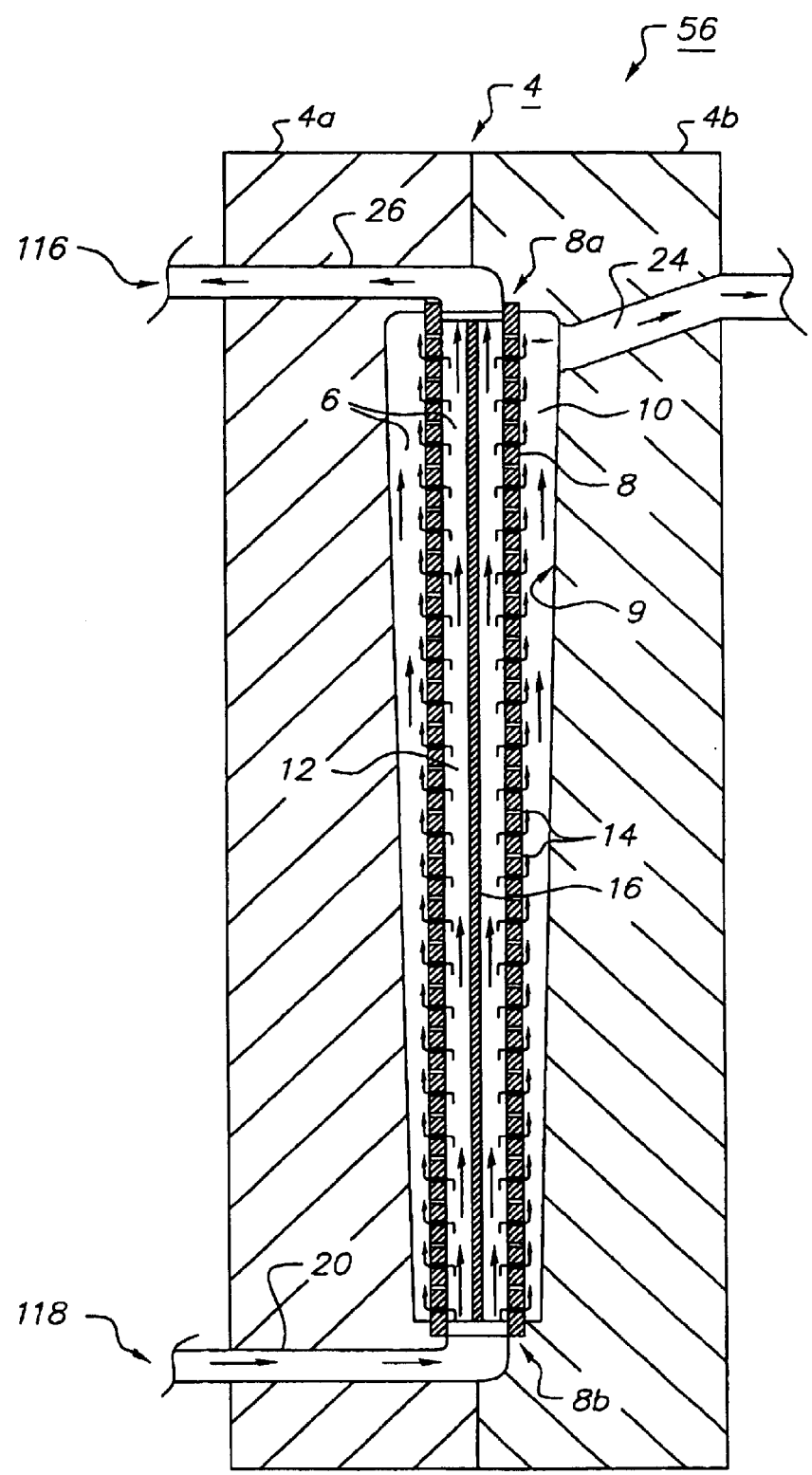
FIG. 3 is a schematic, cross-sectional elevation view of one embodiment of a crossflow filter device for use in a coating dispersion filtration and delivery assembly of the present invention.

Referring now to FIG. 3, the filter device 56 can be e.g., a crossflow filter. As illustrated, the filter 56 comprises a housing 4 defining a channel 6; a hollow, porous filter medium 8 positioned in the channel of the housing, wherein the channel 6 is partitioned by the filter medium 8 into an exterior passageway 10 that is exterior to the filter medium and an interior passageway 12 that is interior to the filter medium. The exterior passageway 10 and the interior passageway 12 are in communication via the pores 14 of the filter medium. The liquid to be filtered flows into inlet port 118 to the interior passageway 12 via an inlet conduit 20. The exterior passageway 10 is in communication with a liquid dispensing outlet conduit 24. The interior passageway 12 is in communication with a recirculation outlet conduit 26 for recirculating the liquid from the outlet port 116 through equipment (not shown in FIG. 2) back to the inlet port 118.

The housing 4 comprises a left piece 4a and a right piece 4b suitably joined together by clamps, bolts, or other suitable fastening means (not shown). The porous filter medium 8 is preferably tubular, and made of sintered stainless steel, although any porous medium which (a) has sufficiently small pores to prevent passage of particulate impurities and (b) is resistant to chemical or physical degradation by the liquid being filtered may be suitable. For example, the porous filter medium could be made of ceramic, or of a suitably resistant polymer such as polytetrafluoroethylene (TEFLON®). In one embodiment of the filter medium, a sintered stainless steel cylindrical tube 30 cm long×0.96 cm (inner diameter)×1.19 cm (outer diameter) with an absolute retention rating of 5 micrometers can be used. This tube is a Grade S050 of the S-Series PSS Medium of the Pall Corporation of Cortland N.Y. Other tubes such as the SIKA-R tubes with retention ratings from 0.5 to 10 micrometers available from the GKN Sinter Metals Corporation of Richton Park Ill. are also suitable. The wall of the filter medium comprises the pores that limit the particles that may pass through the filter medium to those particles that are less than a desired size. The filter medium 8 can be chosen such that particles which may pass through the medium are less than 5 microns in maximum dimension. Filter medium 8 for example is held in the channel 6 formed between the two pieces (4a, 4b) of the housing and at ends 8a and 8b of filter medium 8.

Referring still to FIG. 3, the exterior passageway 10 is preferably annular in cross section, with the inner surface of exterior passageway 10 being defined by the outer surface of the filter medium 8 (also referred herein as filter tube or tube), and the outer surface of exterior passageway 10 being defined by the machined surface 9 of channel 6 in housing 4.

As previously defined, a fluid is supplied to the filter device 56 from a source 58 (see FIG. 2) into inlet port 118. Such fluid flows within filter device 56. The portion of fluid that passes through filter medium 8, and through passageway 10 and out of first outlet port 24 is referred to herein as a filtrate. The portion of fluid that passes along the surface of filter medium 8 but does not flow through filter medium 8, and subsequently passes through passageway 12 and out of second outlet port 116 is referred to herein as a decantate.

Figure 7:
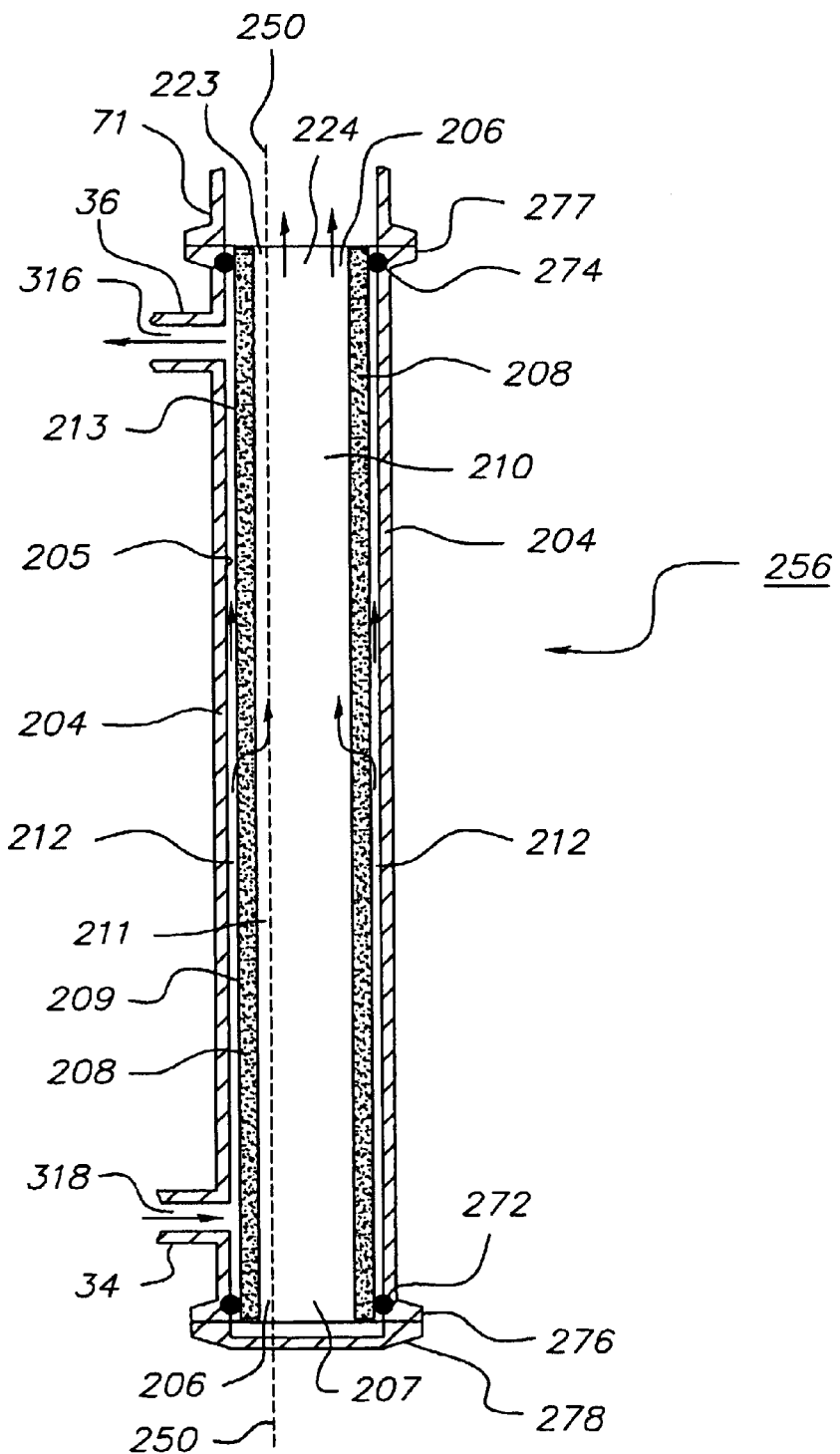
FIG. 7 depicts an alternative embodiment of a crossflow filter that is used in other embodiments of the present invention.

FIG. 7 depicts an alternative embodiment of a crossflow filter that is used in the present invention. Referring to FIG. 7, the filter device 256 comprises a tubular housing 204 comprising a first inlet port 318, a first outlet port 224, and a second outlet port 316. A tubular porous filter medium 208, similar in one embodiment to filter medium 8 of FIG. 3, is disposed within housing 204. Filter medium 208 is held substantially coaxial with housing 204 by suitable holding means. In one embodiment, such holding means comprises a first O-ring 272 disposed in a groove in the inner wall of housing 204, and a second O-ring 274 disposed in a groove in the inner wall of housing 204. O-rings 272 and 274 are chosen to be of a cross-sectional diameter so that they are squeezed between the outer wall of filter medium 208, and the inner wall of housing 204, thereby holding medium 208 in place. In an alternate embodiment (not shown), filter medium 208 is provided with flared ends as a holding means, which provide an interference fit within housing 204. In the embodiment depicted in FIG. 7, filter housing 204 is provided with a sanitary fitting 276 at second inlet port 207, to which is fitted sanitary cap 278, held in place with a sanitary clamp (not shown). It is preferable, though not required, that filter medium 208 extend nearly the full length of housing 208 as depicted in FIG. 7, in order to make the most efficient use of housing 208.

Referring again to FIG. 7, the filter 256 further comprises a cylindrical channel 206 extending the length of housing 208 wherein cylindrical channel 206 is partitioned by the filter medium 208 into an exterior substantially annular passageway 212 that is exterior to the filter medium and an interior passageway 210 that is interior to the filter medium. The exterior annular passageway 212 and the interior passageway 210 are in communication via the pores 14 (see FIG. 3) of the filter medium 208. The liquid to be filtered flows into inlet port 318 to the exterior annular passageway 212 via an inlet conduit 34. The exterior annular passageway 212 is in communication with second outlet port 316 and outlet conduit 36. The interior passageway 210 is in communication with first outlet port 224 and outlet conduit 71.

Thus in continuous steady state operation, a multiphase fluid is pumped from a source 258 (see FIG. 8) through conduit 34 and into inlet 318 of filter 256, while simultaneously multiphase fluid flows axially within annular exterior passageway 212. Such a fluid flow may also have a velocity component that is tangential to the cylindrical surface of filter medium 208, and in one embodiment (not shown), conduits 34 and 36 are joined to housing 204 so as to provide a substantially tangential spiraling flow field within annular exterior passageway 212. Simultaneously, fluid flows cross-wise through the porous filter medium 208 into interior passageway 210, wherein such fluid is a filtrate of a different composition than the fluid from source 258, having had some separation of particles occur as a result of the passage thereof through the pores of filter medium 208. Simultaneously, the filtrate exits filter 256 out through first outlet port 224, and through conduit 71. Simultaneously, a portion of fluid flows axially within annular exterior passageway 212 and out of second outlet port 316, and through conduit 36, wherein such fluid is a decantate of a different composition than the fluid from source 258, as a result of some separation of particles occurring from the passage of fluid through filter medium 208.

In one embodiment wherein filter medium 208 comprises a catalyst, the filtrate is of a different composition than the fluid from source 258, due to a chemical reaction that occurs as a result of the passage thereof through the pores of filter medium 208.

It is to be understood that the dimensions and proportions of the filters 56 of FIG. 3 and 256 of FIG. 7 are for illustration purposes only, and the actual dimensions of the components thereof, and the relative proportions of such components to each other will vary widely, depending upon the particular use of the present invention. In many instances, the dimensions of such components are chosen such that the fluid flows within filter 56 occur at sufficiently high shear rates so as to prevent flocculation of particles in the fluids therein, and/or in order to continuously sweep the surface of the filter medium clean, thereby keeping the surface of such medium clean, and preventing plugging of such medium with accumulated particles.

It is to be further understood that it is not required that filter 256 has an axisymmetrical shape, such as, e.g. a cylindrical shape. In one embodiment, filter 256 has a rectilinear shape. Referring to FIG. 7, in one embodiment, filter 256 has a rectilinear shape defined by a wall along dotted line 250—250. Housing 204 is formed along dotted line 250—250, as well as by the left-hand cross-hatched portion 204 of FIG. 7. Housing 204 comprises inlet port 318, a second outlet port 316, a first outlet port 223, and a substantially rectangular strip of filter medium 208 disposed within housing 204. In steady state operation, fluid is pumped form a source into port 318, wherein such fluid flows through passageway 213 that is substantially rectangular in cross section. Simultaneously, a portion of fluid flows across filter medium 212 into passageway 211 that is substantially rectangular in cross section. Such fluid, the filtrate as previously described, flows out of filter 56 through port 223. Simultaneously, a portion of fluid flows lengthwise within rectangular passageway 213 and out of second outlet port 316, and through conduit 36, wherein such fluid is a decantate as previously described.

This embodiment of the present invention is particularly useful as an implantable device in medical applications; as such embodiment can be made as an extremely compact shape having a laminated structure of thin films. In one embodiment, one of such thin films is a selectively permeable biomembrane that allows the selective flow therethrough of a therapeutic agent that is subsequently infused into the body.

Referring again to FIG. 7 and in one preferred embodiment, filter 256 further comprises in addition to first sanitary fitting 276, a second sanitary fitting 277, a third sanitary fitting connected to inlet conduit 34 (not shown), and a fourth sanitary fitting connected to second outlet conduit 36 (not shown). In a further embodiment (not shown), filter 256 is connected to an additional conduit in place of cap 278. The function of such additional conduit is for a clean-in-place (CIP) operation that is required in food and pharmaceutical process operations.

Referring again to FIG. 7, in an additional embodiment, filter medium 208 is comprised of a magnetic material, such as iron, carbon steel, aluminum-nickel-cobalt (ALNICO) alloy, samarium-cobalt alloy, 400-series stainless steels, and the like. The use of such magnetic material provides filter 256 with the additional or enhanced capability of retaining fine magnetic particles on or in the filter medium 208 therein.

Figure 14:
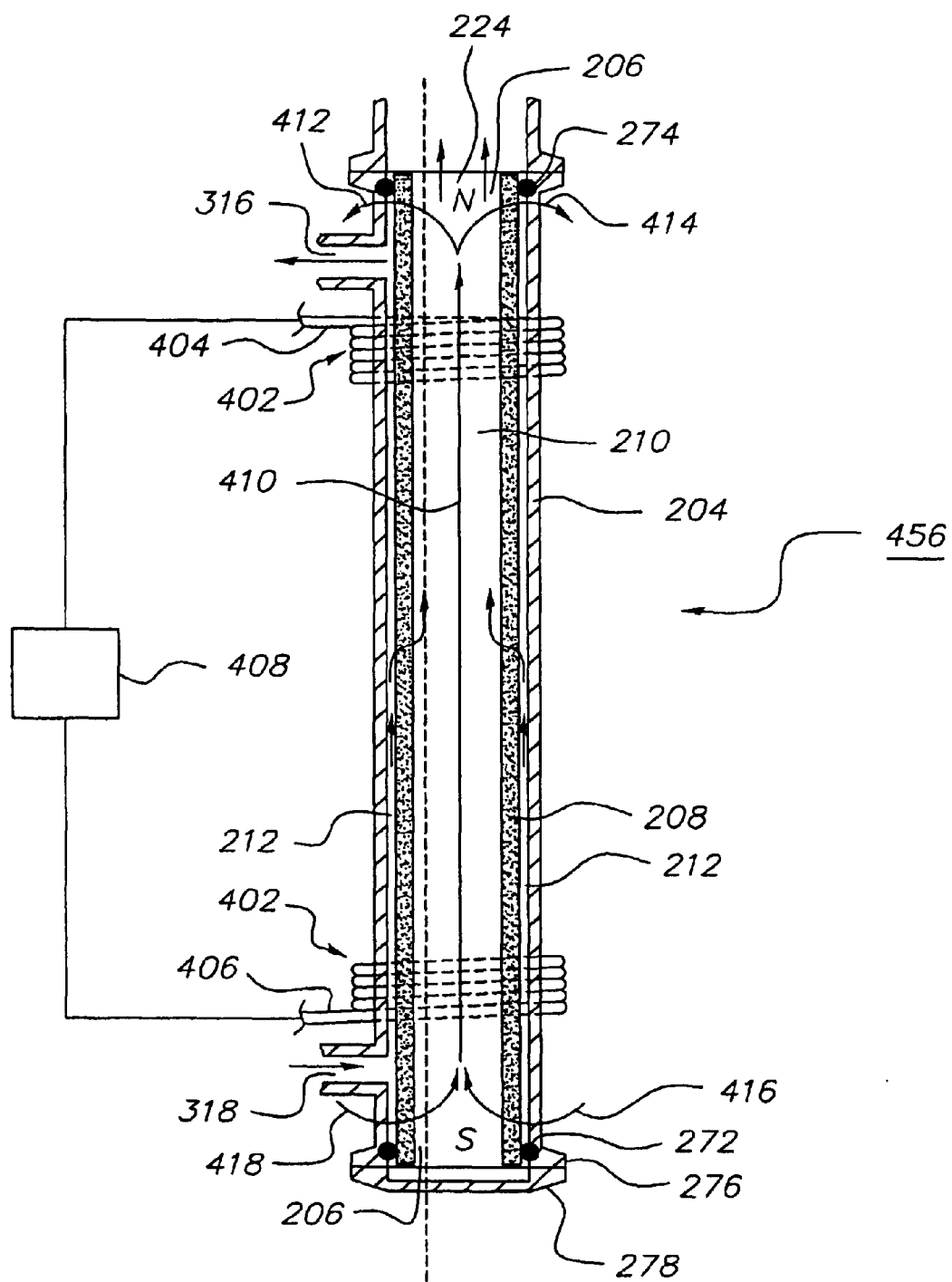
FIG. 14 is another embodiment of a filter of the present invention that is useful in the filtration, classifying, or valving of fluids comprising magnetic particles or ferromagnetic particles.

FIG. 14 is another embodiment of a filter of the present invention that is useful in the processing of fluids comprising magnetic particles or ferromagnetic particles. Referring to FIG. 14, filter 456 is similar to filter 256 of FIG. 7, with filter 456 further comprising a wire coil 402 wound around the exterior surface of filter housing 204. Wire coil comprises a first wire lead 404 and a second wire lead 406 extending outwardly from filter housing 204. For simplicity of illustration, only a first portion of wire coil 402 proximate to lead 406, and a second portion of wire coil 402 proximate to lead 404 are shown, with it being understood that wire coil 402 is disposed along the length of housing 204 therebetween.

In operation, leads 404 and 406 are connected to a direct current electrical power supply 408 thereby inducing a magnetic field within and around filter 456. A portion of such magnetic field is indicated by arrows 410, 412, 414, 416, and 418. When a fluid containing magnetic or ferromagnetic particles is caused to flow through filter 456, the presence of such magnetic field can be used to beneficially affect the separation capabilities of filter 456.

In one embodiment, filter 456 is used as a classifier of magnetic or ferromagnetic fines suspended in a flowing fluid. Because the strength of the induced magnetic field is dependent upon the current flowing through coil 402, such magnetic field is easily varied. The filter medium 208 is chosen with a particular pore size and shape such that in the absence of a magnetic field, all of the particles will pass through the filter medium. When a strong magnetic field is applied thereto, most of the particles will align themselves in such a way as to not pass through the pores or other passages (e.g. through a wire mesh screen) in the filter medium 208. Only the smallest of such particles will pass therethrough. As the magnetic field is successively decreased, successively larger particles will be allowed to pass through such filter medium. The filtrate may be selectively collected in a series of sub-batches, thereby effecting the classification of the magnetic particles therein.

In another embodiment, filter 456 is used to filter the dispersion of fluid used in the coating of storage media, such as audio tape, video tape, hard disks, and the like. The selective application of a magnetic field within the filter enables the selective retention therein of large magnetic particles, which would otherwise result in defects in the coated product. At such time as the filtrate is no longer being delivered to a coating applicator, the magnetic field may be removed, thereby releasing such particles in a stream directed to a waste collection or recycling destination. In one embodiment, an alternating current is applied to the filter, thereby facilitating the discharge of such large particles from the filter. Such a process is also useful in the preparation of nanomagnetic materials that are used as coatings that shield objects from undesired magnetic fields.

In another embodiment, filter 456 is used as a combination filter and/or valve for the filtration and delivery of magnetorheological fluids used in the precision finishing of optical elements. Apparatus, materials, and processes for magnetorheological finishing are disclosed in U.S. Pat. Nos. 5,795,212, 6,106,380, 5,839,944, 5,971,835, 5,951,369, 6,506,102, 6,267,651, and 6,309,285, the disclosures of which are incorporated herein by reference. In operation, the filter 456 is provided with a filter medium 208 of the proper porosity to achieve the desired filtration results. Filtrate passes through such filter medium 208 in the absence of any magnetic field therein. Subsequently, when a magnetic field is applied to filter 456, the viscosity of such magnetorheological fluid increases by several orders of magnitude, thereby effectively blocking the flow of such fluid through filter medium 208. When the magnetic field is removed, flow through such filter medium resumes since the viscosity of such magnetorheological fluid decreases to its previous value. Thus filter 456 of FIG. 14 is used as a valve in the delivery and/or filtration of magnetorheological fluids.

Although the filters described herein have been limited to structures having axial symmetry, and a generally cylindrical shape, there is no intent to limit such tangential or crossflow filters to such a configuration. There are many other known tangential or crossflow filters having a filter medium of e.g., a substantially planar rectilinear shape comprising e.g. a rectangular strip of material, as well as other configurations. Such filters are to be considered within the scope of the present invention.

In addition, there are many filter media other than porous ceramic, sintered metal, or polymer fiber media that may be suitable filter media, depending upon the particular application. Other suitable filter media may range from e.g., reverse osmosis membranes, biomembranes, carbon nanotubes, and the like for the filtration of nanoparticle dispersions, to coarse wire mesh screens for slurries and other fluid mixtures comprising large particles, such screens having openings as large as about 0.1 inch or larger.

In a further embodiment, the filter medium may also comprise a catalyst, or a catalytic coating disposed on the inner surface thereof, the outer surface thereof, and/or the surfaces of individual aggregate particles therethrough. Such catalysts are well known, e.g. zeolite catalyst. Such catalytic coatings are also well known, and may comprise metal catalysts such as nickel, platinum, palladium, rhodium, alloys thereof, and mixtures thereof. Alternatively, the filter medium itself may consist essentially of the bulk metal catalyst, or of a first metal or ceramic catalyst coated with one or more additional metal or ceramic catalysts.

Figure 4:
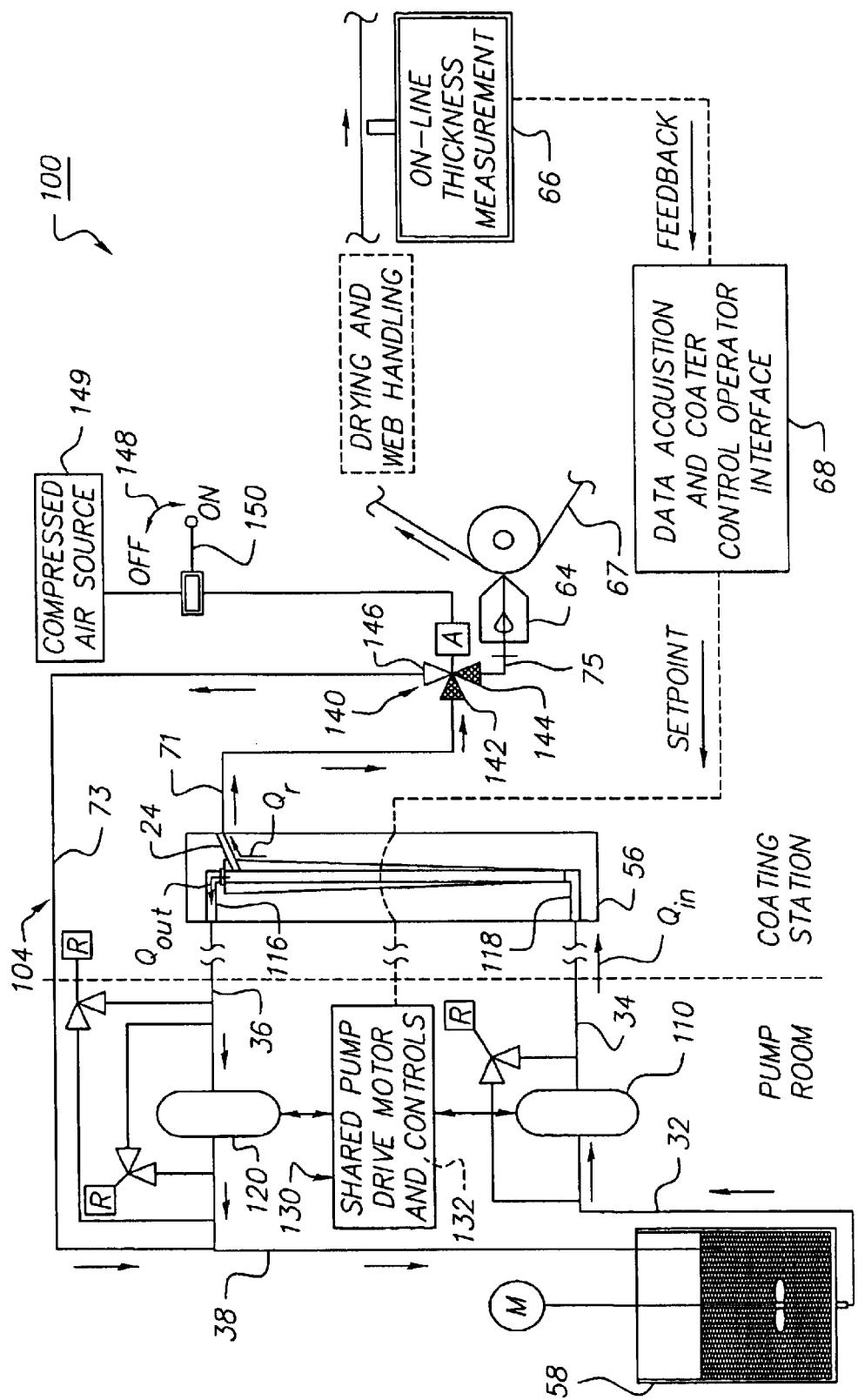
FIGS. 4 and 5 are each a schematic diagram of one embodiment of a coating dispersion filtration and delivery assembly of the present invention including a diverter valve in the "on" and "off" modes respectively.
Figure 5:
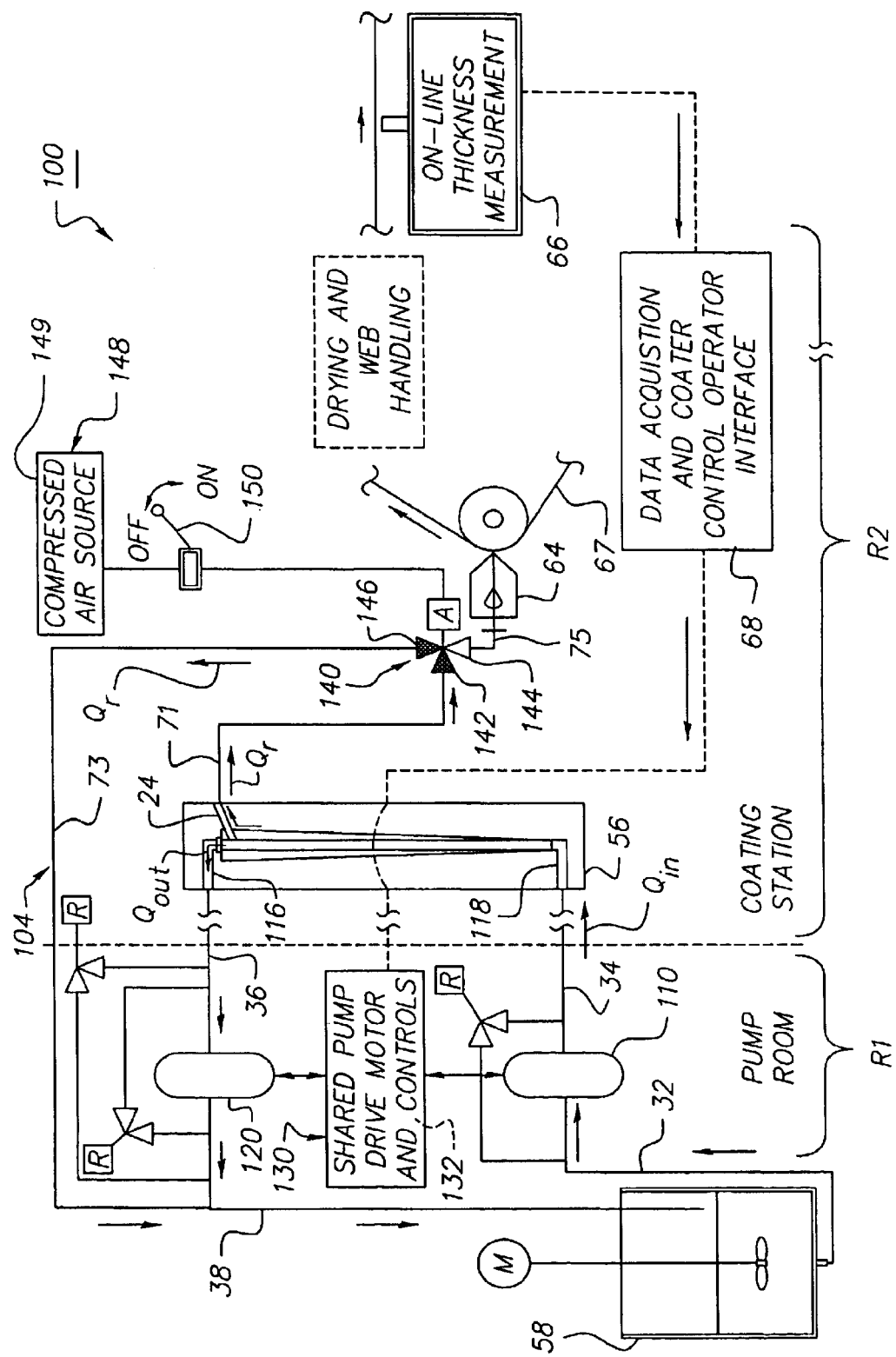

Referring now to FIGS. 4–5, in one preferred embodiment, the fluid filtration and delivery assembly 100 further comprises a diverter valve 140, the fluid porting of which can be switched via means 148. In the embodiment depicted in FIGS. 4 and 5, diverter valve 140 is disposed between filter 56 and coating die 64.

Diverter valve 140 comprises an inlet port 142 that is operatively connected to outlet port 24 of filter 56 via fluid conduit 71, a first outlet port 144 that is operatively connected to coating die 64 via fluid conduit 75, and a second outlet port 146 that is operatively connected to conduit 38 via conduit 73. Diverter valve 140 further comprises suitable means 148 for switching the valve mechanism to direct flow either from the inlet port 142 through the first outlet port 144 (depicted in FIG. 4); or from the inlet port through the second outlet port 146 (depicted in FIG. 5). The diverter valve 140 may be one of several common valves known in the art such as a ball valve, a spool valve, a diaphragm valve, and the like.

In the embodiment depicted in FIGS. 4 and 5, it is preferable to use a diverter valve 140, because in the absence of such a valve (as shown in FIG. 2), the only method to stop fluid flow to the coating die 64 or other filtrate using operation is to stop the pump drive motor 132, thereby stopping the flow of fluid through the filter 56. This is an undesirable method, particularly when filtering dispersions or other multiphase fluids that flocculate, coagulate, congeal, aggregate, or otherwise degrade in some way at low or zero shear rates. Such stoppage obviously will dramatically increase the rate of flocculation or other degradation, which can result in plugging of the pores of the filter when process operation is resumed.

The system of FIG. 4, when delivering a filtrate to a coating applicator or other filtrate using operation, is referred to as being in the "on" or "on-coat" mode in which the resultant filtrate flow $Q_r$ flows to the die head 64 or an alternative filtrate using operation. Referring to FIG. 5, the diverter valve 140 is actuated such that filtrate flow enters the inlet port 142 of the valve, and exits a second outlet port 146 connected to the fluid storage vessel. The system of FIG. 5 is referred to as being in the "off" or "off-coat" mode in which the resultant flow $Q_r$ flows back to the storage vessel 58. Thus, constant fluid flow can be maintained through the filter 56 when an interruption of the coating, dispensing, packaging, or other filtrate using process becomes necessary. The system has the added advantage that when the diverter valve 140 is equipped with a suitable actuator 149, 150 with a fast response time, the system can quickly switch between the "on" and "off" modes. Examples of suitable actuators include, but are not limited to, electric solenoid actuators, and pneumatic actuators (as shown in FIGS. 4 and 5). Such actuators are easily integrated into a computer-based automatic process controller.

The following example is illustrative of one embodiment of the present invention. A fluid filtration and delivery assembly 100 was assembled, comprising an inlet gear pump 110 with a theoretical capacity $C_{in}$ of 27.8 cm$^3$/revolution; and an outlet gear pump 120 with a theoretical capacity $C_{out}$ of 20.6 cm$^3$/revolution. Each of pumps 110 and 120 were operatively engaged with the drive shaft of shared pump drive motor 130 at a one-to-one ratio, and were thus driven at the same rotational speed. Pump drive motor further comprised a speed reducer, resulting in a variable drive shaft speed of zero to 120 revolutions per minute.

This system thereby provided a theoretical capacity of filtrate flow of $C_{in}-C_{out}=C_r$ of 7.2 cm$^3$/revolution. Trials were run with sintered stainless steel filter tubes made by the Mott Corporation rated at 10 microns and 20 microns absolute retention, respectively. The apparatus 100 of FIGS. 4 and 5 was connected to a bench mounted coating die having a slot width of approximately 16 inches and a slot height of approximately 0.008 inches, which was formerly used in organic belt photoreceptor manufacturing. Accordingly, this die was representative in substantially simulating the resistance of a variety of coating dies 64 or other dispensing devices or filtrate using devices.

Figure 6:
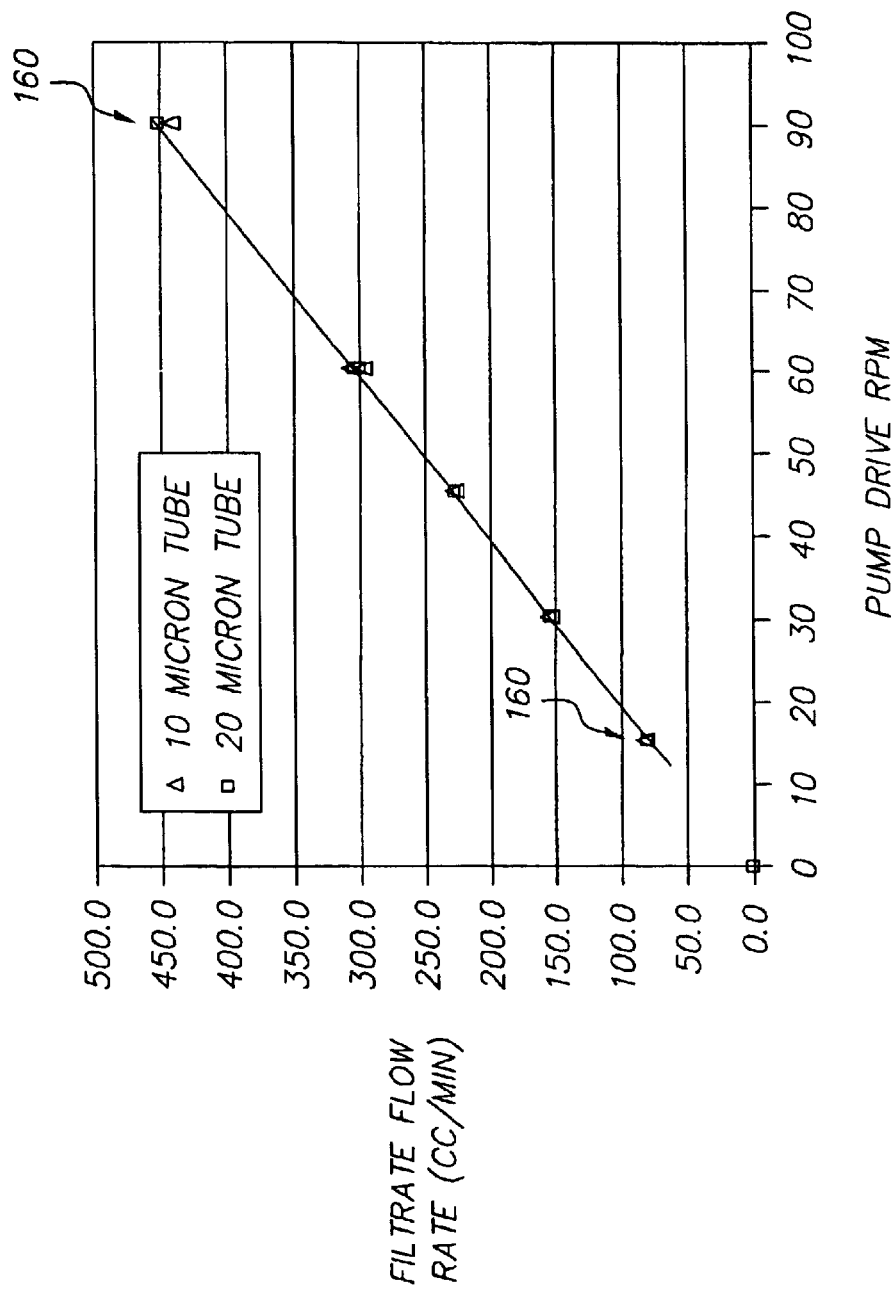
FIG. 6 is a plot of actual measured filtrate flow over a range of 0–90 pump drive RPM in one example of a coating dispersion filtration and delivery assembly of the present invention.

Data for each trial is provided in FIG. 6. Referring to FIG. 6, it is apparent that the theoretical filtrate output of 7.2 cm$^3$/rev. was not achieved. This is likely due to some fluid slippage within the gear pumps. In other words, the actual capacity $C_{in}$ of the inlet pump was somewhat less than 27.8 cm$^3$/rev., and the actual capacity $C_{out}$ of the outlet pump was somewhat greater than 20.6 cm$^3$/rev., such that a very linear output of filtrate flow shown as line 160 over the range of 0–90 pump drive RPM was achieved, with an actual output capacity (i.e. slope of line 160) of approximately 5.0 cm$^3$/rev. It is thereby demonstrated that the fluid filtration and delivery assembly 100 of the present invention is an effective system for metering filtrate through a cross-flow filter using a single control variable, pump drive rotational speed. No additional control of other fluid metering devices such as metering valves etc. is required.

The present invention is not limited to the production of a filtrate for use in a coating process or other filtrate using operation. Rather the apparatus of the present invention is more broadly defined as multiphase fluid separation and delivery apparatus and method for filtering a multiphase fluid comprising a filter device having an inlet port for connecting to a fluid source, a first outlet port for directing filtrate to a first destination, and a second outlet port for directing decantate to a second destination; an inlet pump connected between the inlet port of the filter device and the fluid source for pumping fluid at a flow rate of $Q_{in}$ into the filter device; and an outlet pump connected between the second outlet port of the filter device and the second destination for pumping fluid at a flow rate of $Q_{out}$ out of the filter device to a second destination. The outlet pump and the inlet pump are sized and controlled so that $Q_{out}$ is less than $Q_{in}$, and so that the resulting flow rate of filtrate $Q_r$ from the filter device through the first outlet port to the first destination is equal to $Q_{in}-Q_{out}$.

Figure 8:
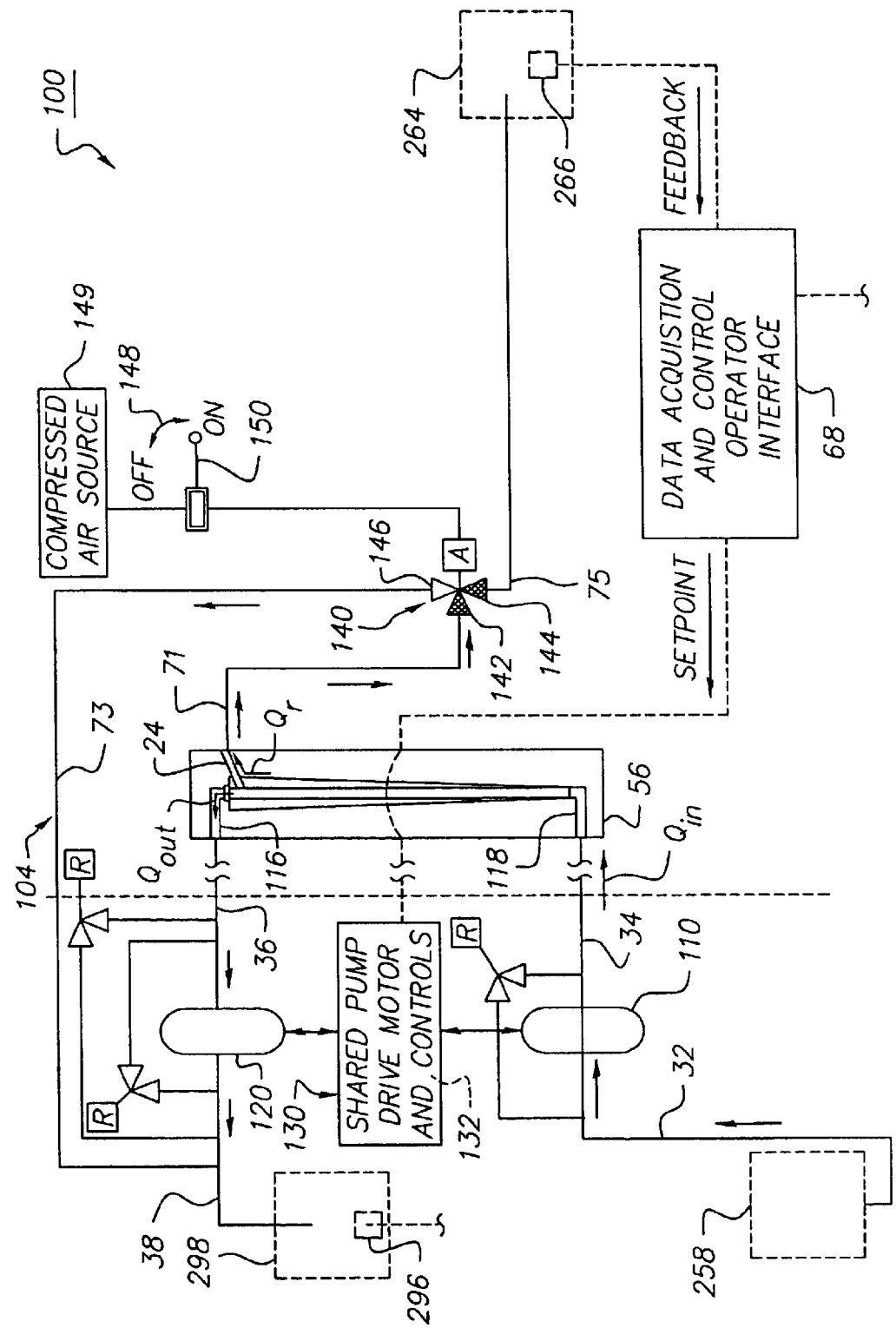
FIG. 8 is a schematic diagram of a more generalized system of the fluid separation and delivery apparatus of the present invention.

FIG. 8 is a schematic diagram of such a more generalized system. Referring to FIG. 8, at steady state operation, pump 110 draws fluid from source 258, and delivers such fluid to at a flow rate of $Q_{in}$ to inlet port 118 of filter 56 as previously described. Simultaneously, a decantate exits filter 56 through second outlet port 116 at a flow rate of $Q_{out}$ as previously described, and is delivered by pump 120 to a second destination 298 through conduit 38. Destination 298 may comprise sensor means 296 to detect the presence of, the absence of, or a parameter indicating the quality of the decantate delivered thereto. Simultaneously, a filtrate exits out of filter 56 through first outlet port 24 at a flow rate of $Q_{in}-Q_{out}$ as previously described, and is delivered through conduit 71, optionally through diverter/selector valve means 140, and through conduit 75 to destination 264. Destination 264 may comprise sensor means 266 to detect the presence of, the absence of, or a parameter indicating the quality of the filtrate delivered thereto.

In the embodiments previously described and shown in FIGS. 2, 4, and 5, the filtrate produced by the process was the product of value. However, in other embodiments, the decantate is the product of value. In still other embodiments, both the filtrate and the decantate are valuable products. Accordingly, the elements that comprise fluid destinations 264 and 298 will vary widely depending upon the particular application. In addition, the elements comprising the fluid source may vary widely. All such embodiments are to be considered within the scope of the present invention.

In one example, the present invention is used to filter a slurry of fine abrasive particles, used for e.g. surface finishing, and source 258 is a slurry manufacturing process. The apparatus and method of the present invention is used to deliver a filtrate comprising a population of fine particles to a first destination 264, and a decantate comprising a population of coarse particles to a second destination 298. In one embodiment, first destination 264 is a packaging process, wherein such fine particle filtrate is packaged in containers for sale. In another embodiment, first destination 264 is a surface finishing process that uses such fine particle filtrate in the manufacturing of a product. In another embodiment, second destination 264 is a packaging process, wherein such coarse particle filtrate is packaged in containers for sale. In another embodiment, second destination 264 is a surface finishing process that uses such coarse particle filtrate in the manufacturing of a product.

In another embodiment, second destination is source 258, i.e. 258 is a vessel, such as vessel 58 of FIG. 2, and the decantate is recycled back to source 258, as shown and previously described in the embodiments of FIGS. 2, 4, and 5. In another embodiment wherein only the decantate is a valuable product, first destination 264 is a waste collection or recycling receptacle. In another embodiment wherein only the filtrate is a valuable product, second destination 298 is a waste collection or recycling receptacle.

In yet a further embodiment (not shown), the first destination 264 of a first separation apparatus 100 is also the source 258 of a downstream second separation apparatus 100. Thus multiple embodiments of the separation apparatus 100 may be connected together in series or in parallel as first and second destinations, thereby providing an overall apparatus for the classification of fine particles in a slurry or other multiphase fluid. In one such embodiment, all of the pumps of the apparatus are driven by a single drive motor, so that the process is controlled by a single variable, pump drive motor speed.

In like manner, the apparatus of the present invention may be used in the manufacturing of a foodstuff such as a soup, thereby providing a first highly viscous, stew-like product stream to a first packaging process, and a second less viscous broth-like product stream to a second packaging process. The apparatus of the present invention may be used to perform a separation of flowing peanut butter, wherein a first product stream comprises a "crunchy" peanut butter product comprising solid peanut chunks dispersed in liquid peanut butter flowing to a first packaging process, and a second product stream comprises a "creamy" liquid peanut butter flowing to a second packaging process. Many other similar uses of the present invention will be apparent to those skilled in the art.

Figure 9:
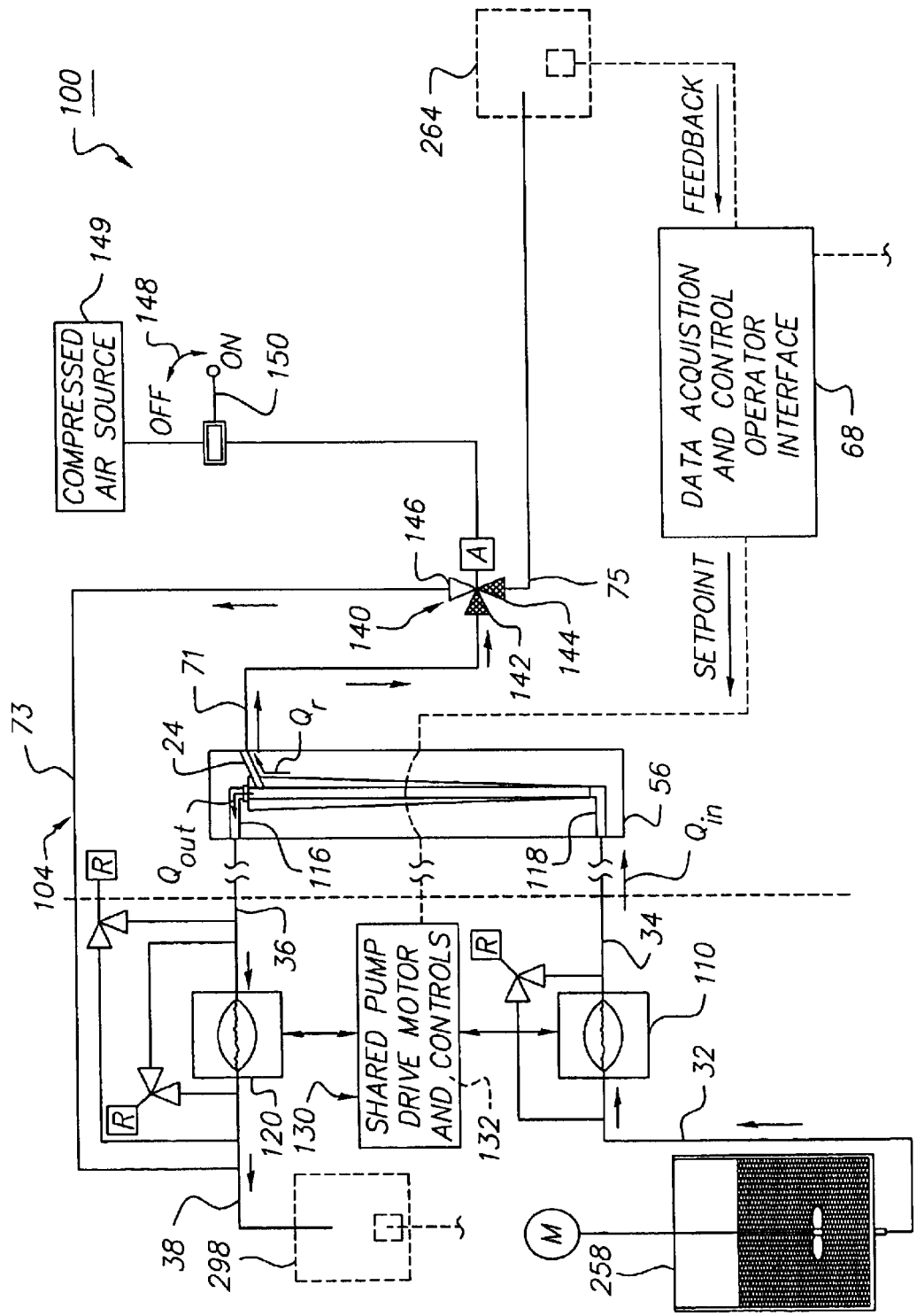
FIG. 9 is a further embodiment of the system of FIG. 8, wherein the fluid pumps are reciprocating pumps.

FIG. 9 is a further embodiment of the system of FIG. 8, wherein the fluid pumps are reciprocating pumps. Referring to FIG. 9, apparatus 100 comprises filter inlet reciprocating pump 110 and filter outlet reciprocating pump 120. For the sake of simplicity of illustration, pumps 110 and 120 are symbolized as diaphragm pumps. It is to be understood that other pumps such as piston pumps are to be considered as substantially equivalent pumping means. Such reciprocating pumps are considered advantageous in use in the present invention since such pumps have substantially no fluid slip, unlike the gear pumps previously described by way of example.

Figure 10:
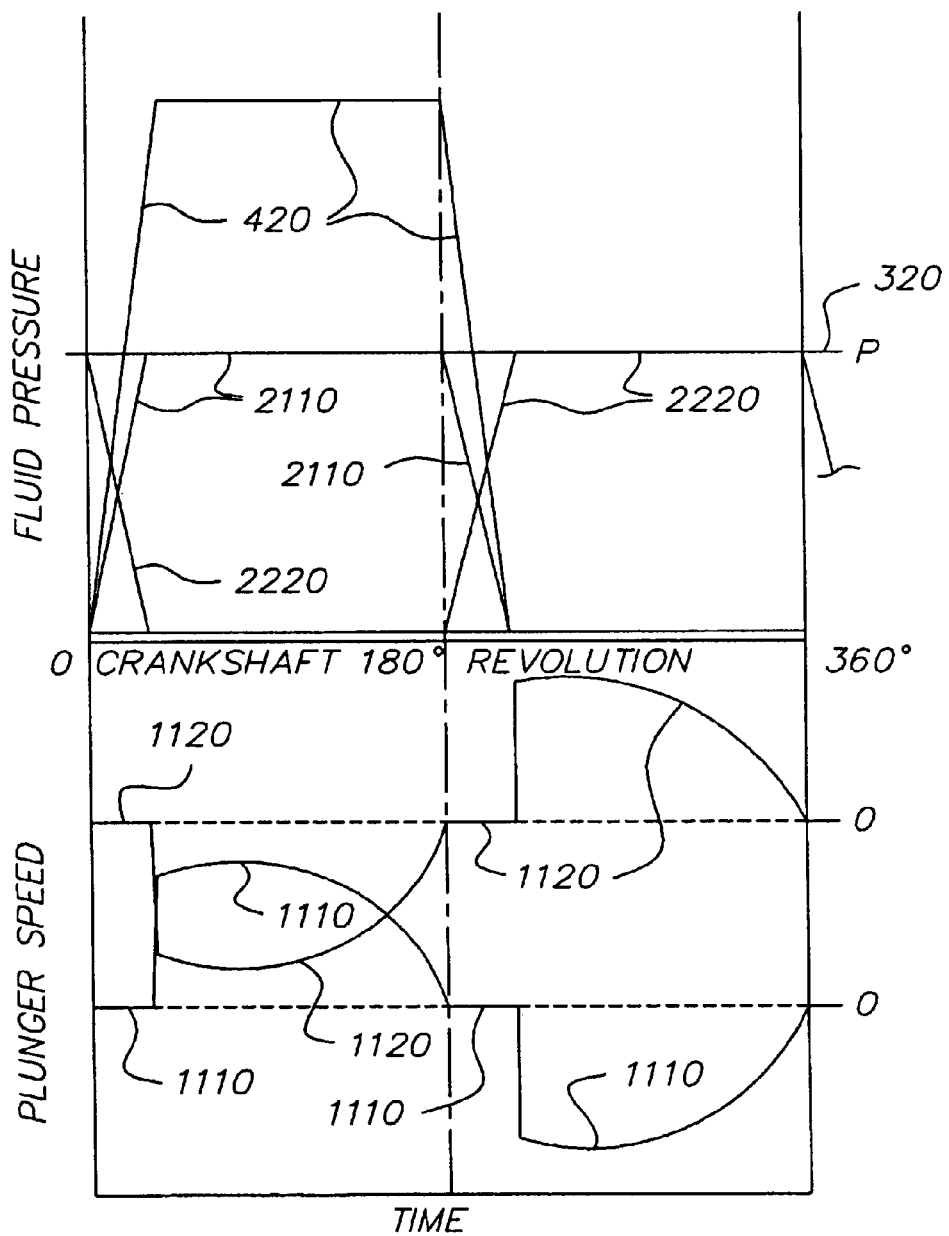
FIG. 10 is a schematic representation of the relationship between plunger (piston) speed and fluid pressure in a piston pump.

Such reciprocating pumps have a characteristic pulsing of fluid flow and pressure output, which can be put to further advantage in the present invention. FIG. 10 is a schematic representation of the relationship between plunger (piston) speed and fluid pressure in a piston pump, taken from page 14 of Horst Fritsch's "Metering Pumps, Principles, Designs, Applications" Verlag Moderne Industrie AG & Co., Lasdsberg, Germany 1989. Referring to FIG. 10, a first reciprocating pump (e.g. pump 110 of FIG. 9) has a piston plunger speed profile in time of 1110, and an internal fluid pressure in time of 2110.

If pump 120 of FIG. 9 is operated approximately 180 degrees out of phase with pump 110, the resulting fluid pressure is maintained in the system approximately constant at a pressure P indicated by horizontal line 320. Such operation provides for a smoother flow of fluid through filter 56 with less pulsation and pressure waves. If pump 120 of FIG. 9 is operated approximately in phase with pump 110, the resulting fluid pressure in filter 56 will pulse strongly, as indicated by profile 420. Such a highly varying pressure profile, with such sharp discontinuities, can provide a shock wave effect within filter 56, thereby helping to prevent the plugging of the filter medium therein. It will be apparent to those skilled in the art that some tuning of the relative timing of the cycles of pumps 110 and 120 may be required in order to synchronize the arrival of such pressure pulses and/or shock waves into filter 56, depending on such parameters as the lengths, diameters, and elasticities of conduits 34 and 36.

In such an embodiment comprising a pair of piston pumps, such pumps may comprise a single pump assembly having a crankshaft that drives the piston of inlet pump 110, and the piston of outlet pump 120, wherein the piston bore of pump 110 is greater than the piston bore of pump 120, and thus the capacity of inlet piston pump 110 is greater than the capacity of outlet piston pump 120, each of said pumps being cycled at the same frequency.

In a further embodiment, pumps 110 and 120 comprise a single pump assembly comprising a double diaphragm pump, wherein the capacity of inlet diaphragm pump 110 is greater than the capacity of outlet diaphragm pump 120. Such double diaphragm pumps are well known in the fluid processing arts.

Figure 11:
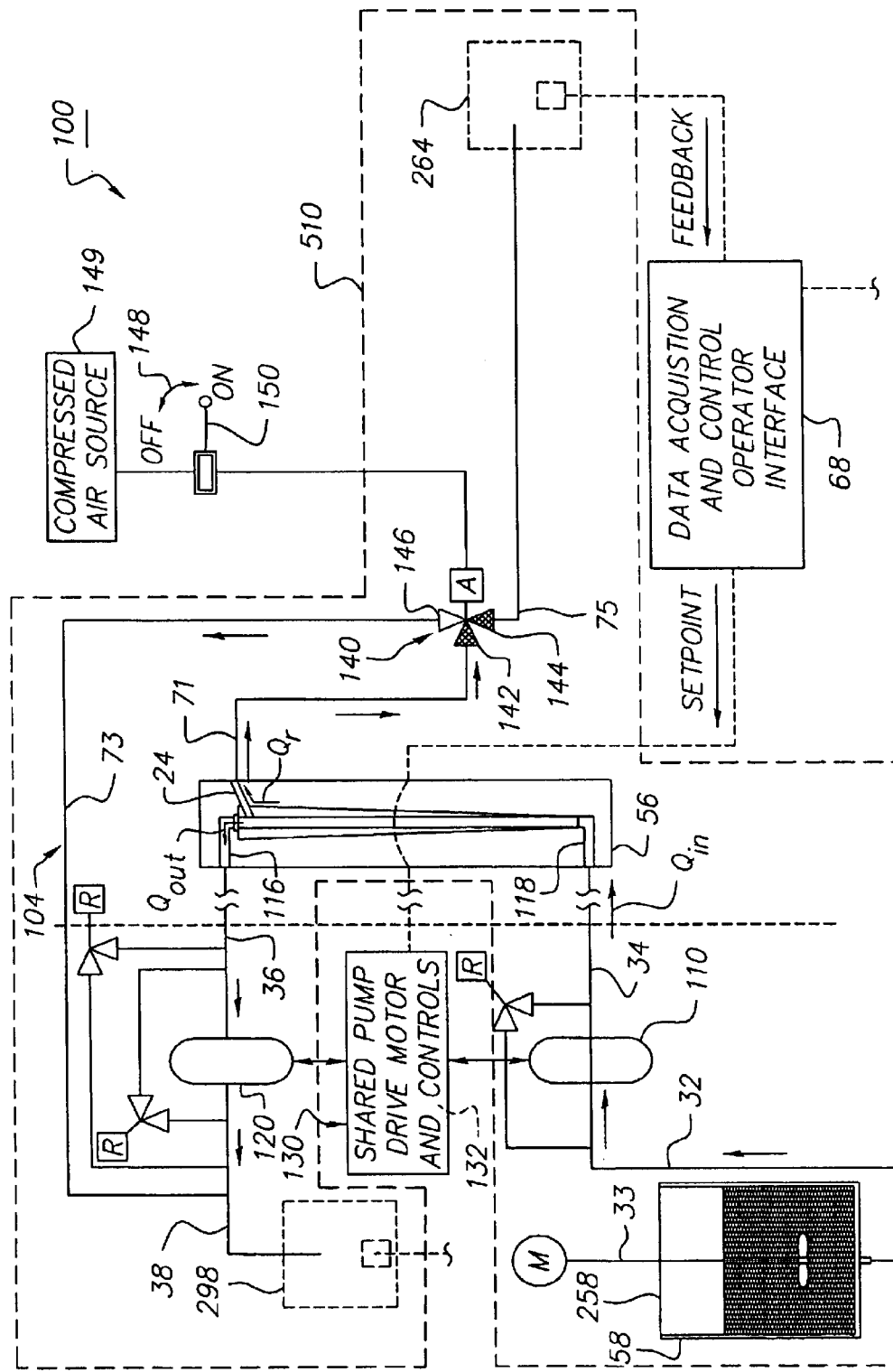
FIG. 11 is a schematic diagram of a further embodiment of a system of the fluid separation and delivery apparatus of the present invention, suitable for the processing of a hot melt fluid.

FIG. 11 is a schematic diagram of a further embodiment of a system of the fluid separation and delivery apparatus of the present invention, suitable for the processing of a hot melt fluid. Referring to FIG. 11, apparatus 100 further comprises a heating system 510, which encloses and heats fluid source 258 (optionally comprising vessel 58 and mixer 33), pump 110, filter 56, pump 120, fluid destination 264, fluid destination 298, conduits 32, 34, 36, 38, 71, and flow diverter means 140 if present, and conduits 73 and 75 if present. Such heating systems are well known in the hot melt polymer processing arts, and are used in e.g. fiber and film extrusion processes. Thus the apparatus and method of the present invention may be used in the filtration of flowing hot melts comprising small fibers or particles, such as carbon or glass fibers or particles. Such hot melts are used in the fabrication of products made of composites.

Figure 12:
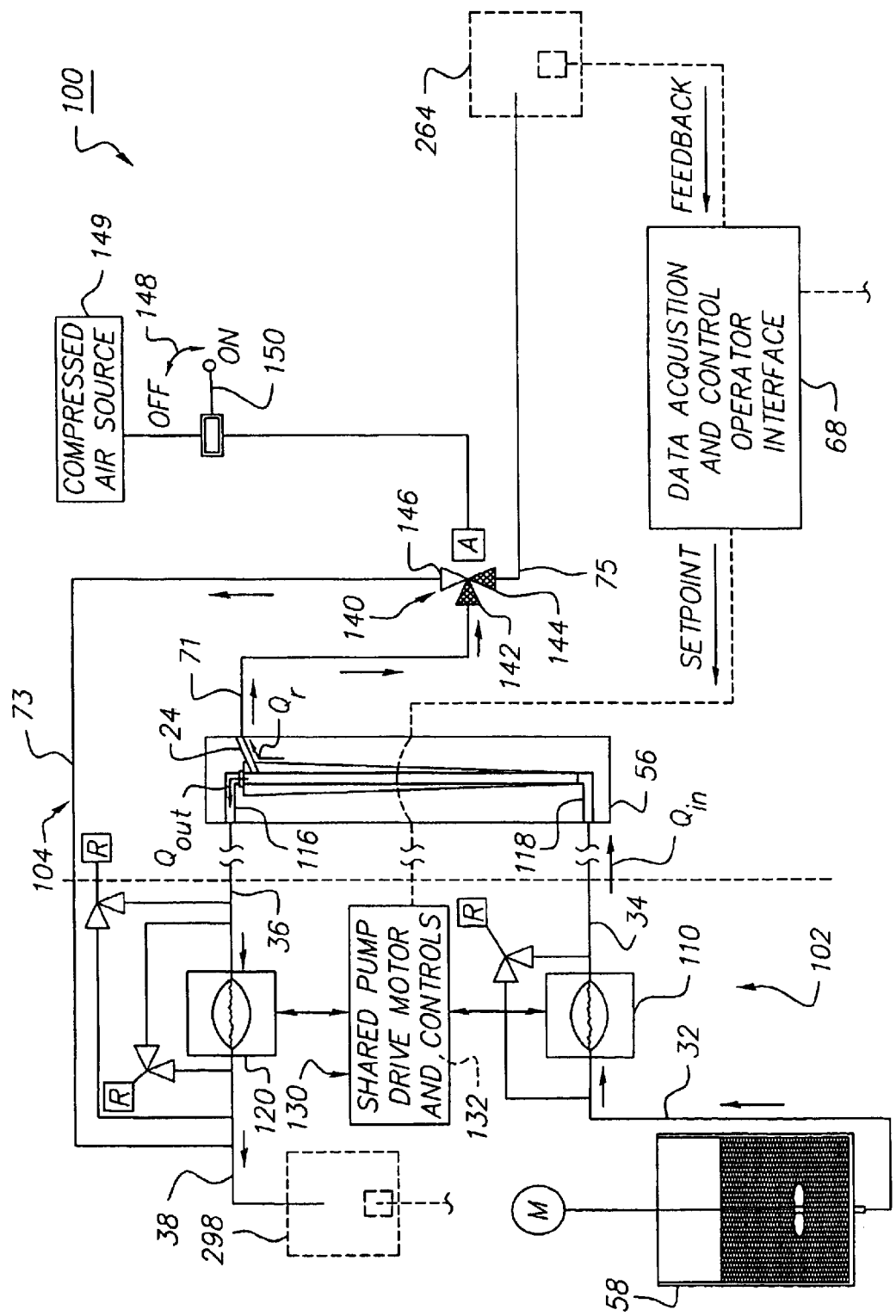
FIG. 12 is a schematic diagram of a further embodiment of a system of the fluid separation and delivery apparatus of the present invention, wherein the filtration system of which is suitable for implantation in a living body.

FIG. 12 is a schematic diagram of a further embodiment of a system of the fluid separation and delivery apparatus of the present invention, wherein the filtration system of which is suitable for implantation in a living body. Referring to FIG. 12, in one embodiment, filter 56 is formed in an extremely compact shape having a laminated structure of thin films. In a further embodiment, one of such thin films is a selectively permeable biomembrane that allows the selective flow therethrough of a therapeutic agent that is subsequently infused into the body. Filter system 104 comprising filter 56, lumens 34, 36, and 71, and optionally, flow diverter means 140 and flow switching means 149, is implanted in the living body. Fluid destination 264 may be an organ or other metabolic site to which such therapeutic agent is delivered. In a further embodiment, the filter medium of filter 56 is placed in direct contact with tissue, such that the therapeutic agent is infused directly into such tissue. Refering again to FIG. 12, pumping system 102 is disposed outside of the body, with lumens 34 and 36 passing through the epidermis and other tissues thereof.

Figure 13:
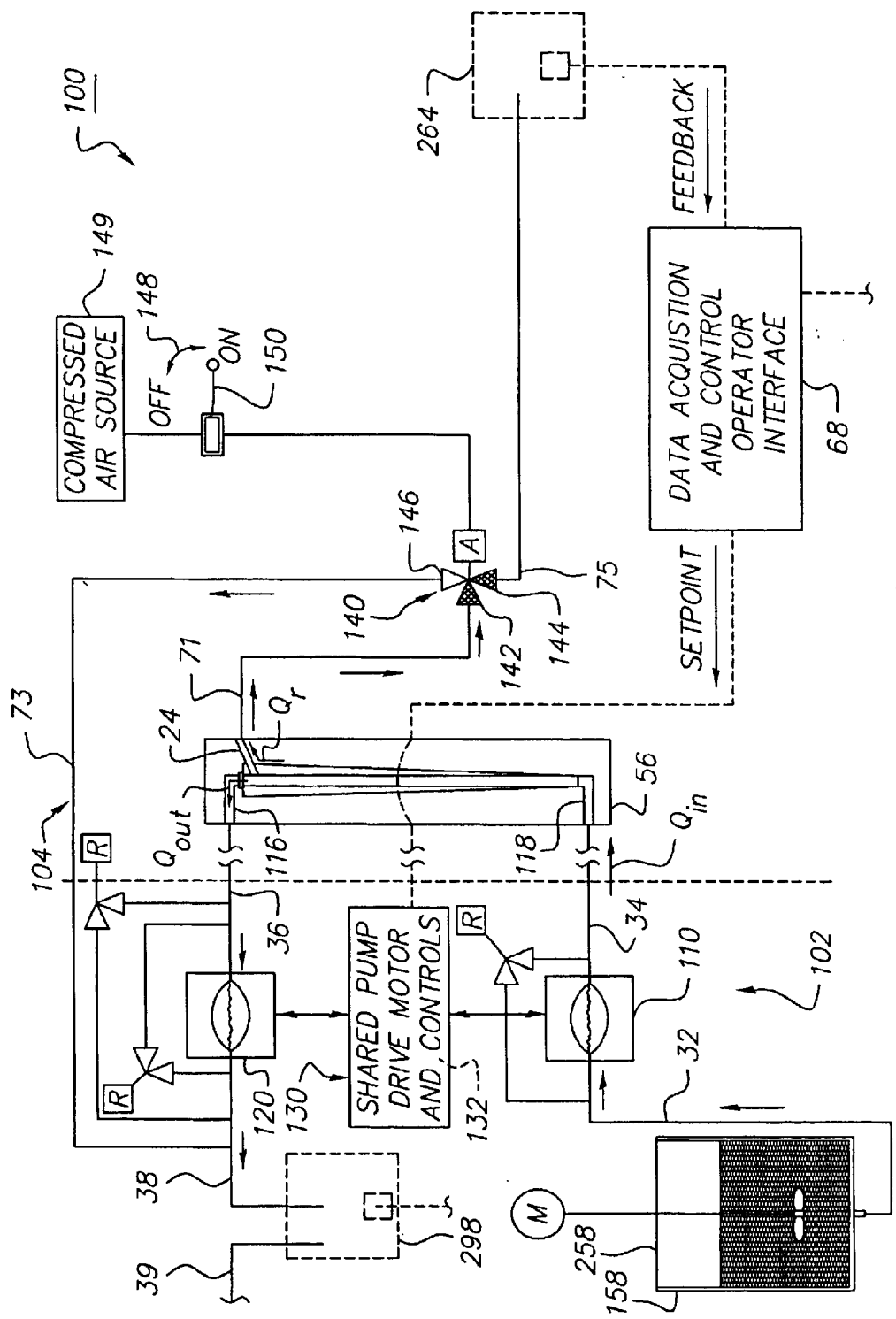
FIG. 13 is a schematic diagram of a further embodiment of a system of the fluid separation and delivery apparatus of the present invention, wherein such apparatus is suitable for implantation in a living body.

FIG. 13 is a schematic diagram of a further embodiment of a system of the fluid separation and delivery apparatus of the present invention, wherein the filtration system of which is suitable for implantation in a living body. Referring to FIG. 13, in one embodiment, filter 56 is similar to FIG. 56 of FIG. 12. In one embodiment, pumps 110 and 120 are formed from small pieces of piezoelectric film, thereby forming miniature diaphragm pumps. In another embodiment, pumps 110 and 120, and lumens 34, and 36 are all formed as an integrated microelectromechanical (MEM) structure that is fabricated monolithically by fabrication processes such as microlithography and direct circuit writing.

In the embodiment depicted in FIG. 13, fluid source 258 may comprise a small collapsible bag 158 of fluid containing a therapeutic agent, which is processed within filter 56 and delivered to destinations 264 and/or 298 within the body. In another embodiment, fluid source 258 is a first location in body itself (not shown), fluid destination 264 receiving a filtrate is a second location in the body, and fluid destination 298 is an expandable waste collection vessel, which is connected to a point external to the body by another lumen 39. Thus the embodiment of FIG. 13 has the function of an implanted drug delivery system, and artificial organ for purifying or treating a bodily fluid, or both.

As can be seen, there has been provided a multiphase fluid separation and delivery apparatus and method for filtering a multiphase fluid withdrawn from a source and delivering a filtrate derived from such source fluid to a first destination, and delivering a decantate derived from such source fluid to a second destination. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A fluid separation and delivery apparatus for filtering a fluid from a fluid source and delivering a filtrate derived from said fluid from said fluid source to a first destination, and delivering a decantate derived from said fluid from said fluid source to a second destination comprising:
   a) a crossflow filter device comprising
      1) a housing comprising a first inlet port for connecting to said fluid source, a first outlet port for directing said filtrate to said first destination, and a second outlet port for directing said decantate to said second destination, and a channel formed within said housing; and
      2) a porous filter medium disposed within said housing, said porous filter medium consisting essentially of a magnetic material, and said porous filter medium partitioning said channel into a first passageway between said first inlet port of said housing and said second outlet port of said housing, and a second passageway in communication with said first outlet port of said housing;

b) an inlet pump connected between said first inlet port of said filter device and said fluid source for pumping fluid at a flow rate of $Q_{in}$ into said filter device; and c) an outlet pump connected between said second outlet port of said filter device and said second destination for pumping said decantate at a flow rate of $Q_{out}$ out of said filter device to said second destination, wherein said outlet pump and said inlet pump are sized and controlled so that $Q_{out}$ is less than $Q_{in}$ and so that said filtrate flows from said first outlet port of said filter device to said first destination at a flow rate $Q_r$ equal to $Q_{in}-Q_{out}$.

2. A fluid separation and delivery apparatus for filtering a fluid from a fluid source and delivering a filtrate derived from said fluid from said fluid source to a first destination, and delivering a decantate derived from said fluid from said fluid source to a second destination comprising:

a) a crossflow filter device comprising
  1) a tubular housing comprising an exterior surface, a first inlet port for connecting to said fluid source, a first outlet port for directing said filtrate to said first destination, and a second outlet port for directing said decantate to said second destination, and a channel formed within said housing;
  2) a porous tubular filter medium disposed within said housing, said porous tubular filter medium partitioning said channel into a first passageway between said first inlet port of said housing and said second outlet port of said housing, and a second passageway in communication with said first outlet port of said housing; and
  3) a wire coil wound around said exterior surface of said filter housing, said wire coil comprising a first lead and a second lead.

b) an inlet pump connected between said inlet port of said filter device and said fluid source for pumping fluid at a flow rate of $Q_{in}$ into said filter device; and c) an outlet pump connected between said second outlet port of said filter device and said second destination for pumping said decantate at a flow rate of $Q_{out}$ out of said filter device to said second destination, wherein said outlet pump and said inlet pump are sized and controlled so that $Q_{out}$ is less than $Q_{in}$ and so that said filtrate flows from said first outlet port of said filter device to said first destination at a flow rate of $Q_r$ equal to $Q_{in}-Q_{out}$.

3. The fluid separation and delivery apparatus as recited in claim 2, wherein said apparatus further comprises a power supply connected to said first lead and said second lead of said coil.

* * * * *